US008121908B2

(12) United States Patent
Oney et al.

(10) Patent No.: US 8,121,908 B2
(45) Date of Patent: Feb. 21, 2012

(54) DATA COLLECTION METHOD AND REPORT GENERATION APPARATUS INCLUDING AN AUTOMATCH FUNCTION FOR GENERATING A REPORT ILLUSTRATING A FIELD ORDER AND ASSOCIATED INVOICE

(75) Inventors: Bruce A. Oney, Sugar Land, TX (US); Paolo Censi, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 10/222,172

(22) Filed: Aug. 16, 2002

(65) Prior Publication Data

US 2004/0034578 A1 Feb. 19, 2004

(51) Int. Cl.
*G06Q 10/00* (2006.01)
*A01K 5/02* (2006.01)
*G06F 17/50* (2006.01)

(52) U.S. Cl. ........ 705/28; 705/29

(58) Field of Classification Search ........ 705/28, 705/29, 30, 34
See application file for complete search history.

(56) References Cited

U.S. PATENT DOCUMENTS

| | | | | | |
|---|---|---|---|---|---|
| 5,548,753 | A | * | 8/1996 | Linstead et al. | 707/1 |
| 5,970,476 | A | * | 10/1999 | Fahey | 705/28 |
| 6,070,150 | A | * | 5/2000 | Remington et al. | 705/34 |
| 6,134,549 | A | * | 10/2000 | Regnier et al. | 707/9 |
| 6,151,588 | A | * | 11/2000 | Tozzoli et al. | 705/37 |
| 6,745,229 | B1 | * | 6/2004 | Hauryluck et al. | 709/206 |
| 2001/0025262 | A1 | * | 9/2001 | Ahmed | 705/33 |
| 2002/0046164 | A1 | * | 4/2002 | Kawakami et al. | 705/40 |
| 2002/0107794 | A1 | * | 8/2002 | Furphy et al. | 705/40 |
| 2004/0044951 | A1 | * | 3/2004 | Repko et al. | 715/500 |

* cited by examiner

*Primary Examiner* — Asfand Sheikh

(57) ABSTRACT

A system is disclosed for storing and maintaining a plurality of field orders and a corresponding plurality of invoices. This system allows a supplier and a buyer to easily view and obtain copies of one or more of the field orders and their corresponding invoices when proper security constraints are satisfied. The system includes a computer server adapted to receive input data comprising a plurality of field orders and a corresponding plurality of invoices, the field orders and the invoices being stored in a memory of the server. A processor of the server will execute a software package stored in a memory of the server called a report generation software. When the report generation software is executed by the processor of the server, a 'special report' is available for display on the server's recorder or display device, that 'special report' being adapted to be viewed by either the buyer or the supplier. On that 'special report', there are three columns. A first column consists of a plurality of descriptions of goods or services. A second column consists of a plurality of field orders. A third column consists of a plurality of invoices corresponding, respectively, to the plurality of field orders. The 'special report' can be viewed by the buyer when the buyer accesses the supplier's server via the internet and initiates an 'automatch' function. However, before accessing the supplier's server, the buyer must first input certain security constraints, such as username and password.

19 Claims, 18 Drawing Sheets

Schlumberger eZView

Search | User Administration | Company List | XML Association | XML Import | Submit Files | Logout

[Search]

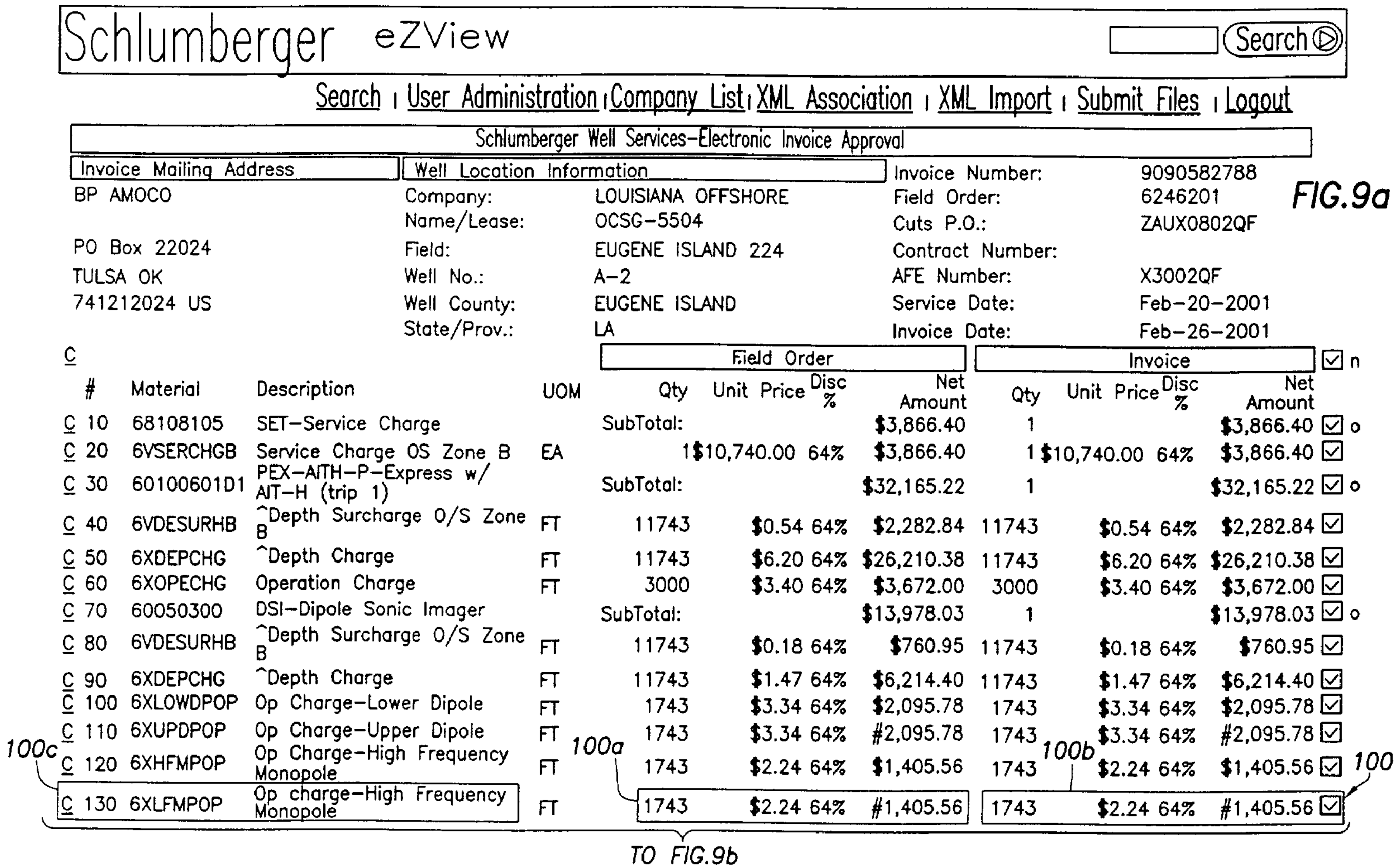

FIG. 9a

Schlumberger Well Services-Electronic Invoice Approval

| Invoice Mailing Address | Well Location Information | | Invoice Number: | 9090582788 |
|---|---|---|---|---|
| BP AMOCO | Company: | LOUISIANA OFFSHORE | Field Order: | 6246201 |
| | Name/Lease: | OCSG-5504 | Cuts P.O.: | ZAUX0802QF |
| PO Box 22024 | Field: | EUGENE ISLAND 224 | Contract Number: | |
| TULSA OK | Well No.: | A-2 | AFE Number: | X3002QF |
| 741212024 US | Well County: | EUGENE ISLAND | Service Date: | Feb-20-2001 |
| | State/Prov.: | LA | Invoice Date: | Feb-26-2001 |

| | | | | | Field Order | | | | Invoice | | |
|---|---|---|---|---|---|---|---|---|---|---|---|
| # | Material | Description | UOM | Qty | Unit Price | Disc % | Net Amount | Qty | Unit Price | Disc % | Net Amount |
| 10 | 68108105 | SET-Service Charge | | SubTotal: | | | $3,866.40 | | | | $3,866.40 ☑ |
| 20 | 6VSERCHGB | Service Charge OS Zone B | EA | 1 | $10,740.00 | 64% | $3,866.40 | 1 | $10,740.00 | 64% | $3,866.40 |
| 30 | 60100601D1 | PEX-AITH-P-Express w/ AIT-H (trip 1) | | SubTotal: | | | $32,165.22 | | | | $32,165.22 ☑ |
| 40 | 6VDESURHB | ^Depth Surcharge O/S Zone B | FT | 11743 | $0.54 | 64% | $2,282.84 | 11743 | $0.54 | 64% | $2,282.84 |
| 50 | 6XDEPCHG | ^Depth Charge | FT | 11743 | $6.20 | 64% | $26,210.38 | 11743 | $6.20 | 64% | $26,210.38 |
| 60 | 6XOPECHG | Operation Charge | | 3000 | $3.40 | 64% | $3,672.00 | 3000 | $3.40 | 64% | $3,672.00 |
| 70 | 60050300 | DSI-Dipole Sonic Imager | | SubTotal: | | | $13,978.03 | | | | $13,978.03 ☑ |
| 80 | 6VDESURHB | ^Depth Surcharge O/S Zone B | FT | 11743 | $0.18 | 64% | $760.95 | 11743 | $0.18 | 64% | $760.95 |
| 90 | 6XDEPCHG | ^Depth Charge | FT | 11743 | $1.47 | 64% | $6,214.40 | 11743 | $1.47 | 64% | $6,214.40 |
| 100 | 6XLOWDPOP | Op Charge-Lower Dipole | FT | 1743 | $3.34 | 64% | $2,095.78 | 1743 | $3.34 | 64% | $2,095.78 |
| 110 | 6XUPDPOP | Op Charge-Upper Dipole | FT | 1743 | $3.34 | 64% | #2,095.78 | 1743 | $3.34 | 64% | #2,095.78 |
| 120 | 6XHFMPOP | Op Charge-High Frequency Monopole | FT | 1743 | $2.24 | 64% | $1,405.56 | 1743 | $2.24 | 64% | $1,405.56 |
| 130 | 6XLFMPOP | Op charge-High Frequency Monopole | FT | 1743 | $2.24 | 64% | #1,405.56 | 1743 | $2.24 | 64% | #1,405.56 ☑ |

TO FIG. 9b

FROM FIG.9a

| | | | | | | | | | | | | | | |
|---|---|---|---|---|---|---|---|---|---|---|---|---|---|---|
| C | 140 | 60090305 | LEH–QT Tension from LEH–QT Head | | SubTotal: | | | @2,109.72 | 1 | | | @2,109.72 | ☑ | o |
| C | 150 | 6XDEPCHG | ^Depth Charge | FT | 11743 | $0.31 | 64% | $1,310.52 | 11743 | $0.31 | 64% | $1,310.52 | ☑ | |
| C | 160 | 6XOPECHG | Operation Charge | FT | 3000 | $0.74 | 64% | $799.20 | 3000 | $0.74 | 64% | $799.20 | ☑ | |
| C | 170 | 60100400 | CABLE–Cable Miscellaneous Charges | | SubTotal: | | | $554.27 | 1 | | | $554.27 | ☑ | o |
| C | 180 | 6XSPECIAL | ^Special high Strength Logging Cable | EA | 11743 | $0.08 | 41% | $554.27 | 11743 | $0.08 | 41% | $554.27 | ☑ | |
| C | 300 | 60100501SU | SURF–Surface Equipment Charges | | SubTotal: | | | $4,365.00 | 1 | | | $4,365.00 | ☑ | o |
| C | 310 | 6XAQUCHGD | Acquisition System Charge–per Day | DAY | 10 | $320.00 | 10% | $2,880.00 | 10 | $320.00 | 10% | $2,880.00 | ☑ | |
| C | 320 | 6XEWUCHGD | Engine Winch Unit Charge–per Day | DAY | 10 | $165.00 | 10% | $1,485.00 | 10 | $165.00 | 10% | $1,485.00 | ☑ | |
| C | 330 | 60070105 | RFT–MISC General Conditions | | SubTotal: | | | $7,920.00 | 1 | | | $7,920.00 | ☑ | o |
| C | 340 | 6XRFTSB | Charge for RFT in Standby | HR | 30 | $100.00 | 0% | $3,000.00 | 30 | $100.00 | 0% | $3,000.00 | ☑ | |
| C | 350 | 6XRFTSB | Charge for RFT in Standby | HR | 30 | $100.00 | 0% | $3,000.00 | 30 | $100.00 | 0% | $3,000.00 | ☑ | |
| C | 360 | 6XRFTSB | Charge for RFT in Standby | HR | 6 | $160.00 | 0% | $960.00 | 6 | $160.00 | 0% | $960.00 | ☑ | |
| C | 370 | 6XRFTSB | Charge for RFT in Standby | HR | 6 | $160.00 | 0% | $960.00 | 6 | $160.00 | 0% | $960.00 | ☑ | |
| C | 380 | 60100500SP | SPEC–ND Specialist Miscellaneous Charges | | SubTotal: | | | $2,200.00 | 1 | | | $1,100.00 | ☐ | o |
| C | 390 | 6ZSPEFT | MDT/RFT Specialist–Stand By Time | HR | 11 | $100.00 | 0% | $1,100.00 | 11 | $100.00 | 0% | $1,100.00 | ☑ | |
| C | 391 | 6ZSPEFT | SPEC–ND Specialist Miscellaneous Charges–MDT/RFT Specialist–Stand By Time | | 11 | $100.00 | 0% | $1,100.00 | | $100.00 | 0% | $0.00 | ☐ | |

☑ Invoice and Field Order line items match and/or have been approved
0 No signature
1 Digitally signed with SmartCard
2 Digitally signed with generic profile
3 Signed with user name and password

| | |
|---|---|
| FO Total | $77,729.95 |
| Invoice Total | $76,629.96 |
| Percent Difference | 1.42 |
| Verified Invoice Amount | $73,651.94 |
| Percent Not Verified | 3.89 |

| | | | | | | | | | | | | | |
|---|---|---|---|---|---|---|---|---|---|---|---|---|---|
| ☒ | 260 | 6XCREWHR | Crew Time Charge – per Hour | HR | 19.5 | $225.00 | 41% | $2,588.63 | 19.5 | $225.00 | 41% | $2,588.62 | ☑ 4 |
| Bruce Oney, Schlumberger, 2001-09-06 20:19:14 | | | | | | | | | | | | | |
| Only difference here is a $0.01 rounding error. | | | | | | | | | | | | | 114 |
| ☒ | 270 | 60100501DH | EQT-Equipment Miscellaneous charges | | Subtotal: | | | $5,062.20 | 1 | | | $5,062.20 | |
| ☒ | 280 | 6XEQUIHR | ^Equipment Charge – per Hour | HR | 43 | $160.47 | 41% | $4,071.00 | 43 | $160.47 | 41% | $4,071.00 | ☑ 4 |
| ☒ | 290 | 6XEQUIRA | ^Equipment Charge – per Hour Advanced | HR | 43 | $39.07 | 41% | $991.20 | 43 | $39.07 | 41% | $991.20 | ☑ 4 |
| ☒ | 300 | 60100501SU | SURF-Surface Equipment charges | | Subtotal: | | | $4,365.00 | 1 | | | $4,365.00 | |
| ☒ | 310 | 6XCREWHR | Acquisition System Charge – per Day | DAY | 10 | $320.00 | 10% | $2,880.00 | 10 | $320.00 | 10% | $2,880.00 | ☑ 4 |
| ☒ | 320 | 6XCREWHR | Engine Winch Unit Charge – per Day | DAY | 10 | $165.00 | 10% | $1,485.00 | 10 | $165.00 | 10% | $1,485.00 | ☑ 4 |
| ☒ | 330 | 60070105 | RFT-MISC General Conditions | | Subtotal: | | | $7,920.00 | 1 | | | $7,920.00 | 116 |
| bptest, BP, 2001-09-06 20:13:51 | | | | | | | | | | | | | |
| Why are ther two sets of charges here??? | | | | | | | | | | | | | |
| Bruce Oney, Schlumberger, 2001-09-06 20:22:40 | | | | | | | | | | | | | |
| There was a total of 36 hours of standby time for two sets of equipment. Charges for backup equipment discussed with and approved by Joe Geologist on September 2nd. | | | | | | | | | | | | | |
| ☒ | 340 | 6XRFTSB | Charge for RFT in Standby | HR | 30 | $100.00 | 0% | $3,000.00 | 30 | $100.00 | 0% | $3,000.00 | ☑ 4 |
| ☒ | 350 | 6XRFTSB | Charge for RFT in Standby | HR | 30 | $100.00 | 0% | $3,000.00 | 30 | $100.00 | 0% | $3,000.00 | ☑ 4 |
| ☒ | 360 | 6XRFTSB | Charge for RFT in Standby | HR | 6 | $160.00 | 0% | $960.00 | 6 | $160.00 | 0% | $960.00 | ☑ 4 |
| ☒ | 370 | 6XRFTSB | Charge for RFT in Standby | HR | 6 | $160.00 | 0% | $960.00 | 6 | $160.00 | 0% | $960.00 | ☑ 4 |
| ☒ | 390 | 60100500SP | SPEC- ND Specialist Miscellaneous Charges | | Subtotal: | | | $2,200.00 | 1 | | | $2,200.00 | |
| ☒ | 390 | 6XCREWHR | MDT/RFT Specialist – Stand By Time | HR | 11 | $100.00 | 0% | $1,100.00 | 11 | $100.00 | 0% | $1,100.00 | ☑ 4 |
| ☒ | 391 | 6XCREWHR | SPEC – ND Specialist Miscellaneous Charges MDT/RFt Specialist – Stand By Time | HR | 11 | $100.00 | 0% | $1,100.00 | 11 | $0.00 | 0% | $0.00 | ☐ 4 |

| | | | |
|---|---|---|---|
| See legend below | | FO Amount (Pre-Tax) | $77,729.95 |
| Field Ticket Signed By | John Doe | | |
| Title | Well Operator | | |
| Schlumberger Engr | Joe Engineer | | |
| Invoice Verifications | admin | | |
| | Bruce Oney | | |

| | |
|---|---|
| Invoice Amount (Pre-Tax) | $76,629.96 |
| Verified Invoice Amount | $76,629.96 |
| Differenece (Pre-Tax) | $0.00 |
| Percent Difference | .00% |
| Tax | $0.00 |
| Invoice Total with Tax | $76,629.96 |

FIG. 12

Schlumberger

Schlumberger Well Services
Division of Schlumberger Technology Corporation
300 Schlumberger Drive, Sugar Land, TX 77478

Original Invoice

*EDI Transmittal*

| Invoice | Invoice Date | Field Service Order | Service Date | Terms |
|---|---|---|---|---|
| 9090198186 | 07/30/1998 | 1175159 | 07/22/1998 | 30 Days Net from 07/30/1998 |

Bill's Oil Company
MOXA ARCH / WAMSUTTER OPERATIONS
PO Box 157
WAMSUTTER WY 82336

Schlumberger Well Services
a Division of Schlumberger
PO Box 201193
HOUSTON TX 77216-1193
*Tax Registration Number: 22-1692661*
*We can invoice you EDI. Call (281) 285-4230 for more information.*

*Correspondence Address:*
Schlumberger Well Services
PO Box 2175 (MD 100-18)
HOUSTON TX 77251-2175

| Customer PO | Customer AFE | Contract |
|---|---|---|
| ZHWS05GEN1 | | |

| Well Name-Number | Field |
|---|---|
| TWO RIM UNIT 25-4 | WILD ROSE |

| Well Location | Offshore Zone | Price Reference |
|---|---|---|
| SEC:25 T:19N R:96W | | 6N-WL Land 98 Prices |

| County/Parish/Borough | State | Customer Job Representative |
|---|---|---|
| Sweetwater | WY | H. SANDERS |

| Material | Description | Quantity | UOM | Unit Price | Amount |
|---|---|---|---|---|---|
| 61110105C | SET-C - Service Charge CSU PS | 1.00 | | | |
| 6XFLATCHL | Service Flat Charge - Land | 1 00 | EA | 540 00 | |
| 6XSERCHGD | Service Depth Charge | 10,515 00 | FT | 0.14 | |
| Gross Price | | | | | |
| Discount/Surcharge | | | | | |
| Tax | | | | | |
| Sub-Total with Tax | | | | | |
| 610101000C | PDC -Perforating Depth Control | 1 00 | | | |
| 6XDEPDCGR | Depth - PDC-Gamma Ray | 10,515.00 | FT | 0.25 | |
| 6XOPPDCGR | Operation - PDC-Gamma Ray | 2,015.00 | FT | 0.25 | |
| Gross Price | | | | | |
| Discount/Surcharge | | | | | |
| Tax | | | | | |
| Sub-Total with Tax | | | | | |
| 61110300 | MAST - Crane and Mast Charges | 1.00 | | | |
| 6XCRANE0-50 | Daily Charge - Crane up to 50ft | 1.00 | DAY | 465.00 | |
| Gross Price | | | | | |
| Discount/Surcharge | | | | | |
| Tax | | | | | |
| Sub-Total with Tax | | | | | |
| Invoice Total Before Tax | | | | | |
| Taxes | 4.00% | | | | |
| Taxes | 1.00% | | | | |
| Total Amount Due - PAYABLE IN USD FUNDS | | | | | |

Additional EDI Information:

*Plant: 6631 Rock Springs District* *Manager: Eric Berlin (307) 362-9350*

Customer: 10000364 29Dec00:1431 Page 1 of 1

FIG. 18

DATA COLLECTION METHOD AND REPORT GENERATION APPARATUS INCLUDING AN AUTOMATCH FUNCTION FOR GENERATING A REPORT ILLUSTRATING A FIELD ORDER AND ASSOCIATED INVOICE

REFERENCE TO COMPUTER PROGRAM LISTING ON COMPACT DISC

This Application incorporates by reference the file entitled, "Computer Program Listing Appendix", created on Jan. 3, 2012, and having size 35,007 bytes submitted on a separate compact disc. The aforementioned file includes Appendix 2 of an XML Invoice, Appendix 3 of an XML DTD, and Appendix 4 of an XML Style Sheet. The aforementioned file is hereby incorporated by reference into the iDetailed Description of the Invention portion of the application.

BACKGROUND OF THE INVENTION

The subject matter of the present invention relates to a software system residing in a computer/server that is accessible by buyers of goods or services via the internet for displaying a 'special report' on the server which is adapted to be read by a buyer of particular goods and/or services, the report having three columns: a first column having a plurality of descriptions of goods or services, a second column having a plurality of field orders corresponding, respectively to the plurality of goods or services where each field order indicates exactly which goods or services were received and verified by the buyer, and a third column having a plurality of invoices corresponding, respectively, to the plurality of field orders, the buyer locating a particular field order where he personally verified receipt of the goods or services and, adjacent thereto on the 'special report', locating a particular invoice associated, respectively, with the particular field order.

Corporations sell a multitude of products and/or services to other corporations or individuals. A buyer will place an order for goods or services, and a supplier will supply those goods/services. Upon receipt of the goods/services, the buyer will often sign a field order indicating exactly what products and/or services were received by the buyer. Later, the buyer will receive an invoice from the supplier associated with the receipt by the buyer of those goods and/or services. However, when the invoice is received, the buyer may have misplaced his copy of the field order. The buyer wants to compare his copy of the field order, which indicates exactly what products/services he received, with the owed amounts indicated on the invoice to be sure the owed amounts are correct. However, since, sometimes, the buyer has misplaced his copy of the field order, the buyer cannot compare the field order against the invoice. In addition, even if the field orders have not been misplaced, it is necessary to periodically perform certain audits. During these audits, a multitude of field orders are compared against a corresponding multitude of invoices to be sure the owned amounts indicated on the invoices are correct. Disputes sometimes result; the buyer indicating he owes a lesser amount and the supplier indicating that the buyer owes a greater amount.

A better system is needed to allow a supplier and a buyer to easily obtain copies of a plurality of field orders and a corresponding plurality of invoices. As a result, when this better system is implemented, the aforementioned audits may no longer be necessary.

SUMMARY OF THE INVENTION

Accordingly, a better system is disclosed for storing and maintaining a plurality of field orders and a corresponding plurality of invoices. This system allows a supplier and a buyer to easily view and obtain copies of one or more of the field orders and their corresponding invoices when proper security constraints are satisfied. The system includes a computer server adapted to receive input data comprising a plurality of field orders and a corresponding plurality of invoices, the field orders and the invoices being stored in a memory of the server. A processor of the server will execute a software package stored in a memory of the server, the software package being hereinafter called a 'report generation software'. The 'report generation software' is also known by the following trademark: "eZView". When the report generation software (i.e., the "eZView" software) is executed by the processor of the server, a 'special report' is available for display on the server's recorder or display device, that 'special report' being adapted to be viewed by either the buyer or the supplier. On that 'special report', there are three columns. A first column consists of a plurality of descriptions of goods or services. A second column consists of a plurality of field orders. A field order is a verified document, signed by a buyer, which indicates exactly what products or services were received by the buyer. A third column consists of a plurality of invoices corresponding, respectively, to the plurality of field orders. The 'special report' can be viewed by the buyer when the buyer accesses the supplier's server via the internet. However, before accessing the supplier's server, the buyer must first input certain security constraints, such as username and password.

It was previously indicated that the computer server is adapted to receive input data comprising a plurality of field orders and a corresponding plurality of invoices. A novel method is also disclosed herein which represents a new 'business method' for collecting the plurality of field orders and the corresponding plurality of invoices which represents the input data being provided to the server.

Accordingly, a better system is being provided, representing a novel business method and associated apparatus, for efficiently storing, in a computer server belonging to a supplier, a plurality of field orders and a corresponding plurality of invoices and for allowing a buyer to easily access the supplier's server via the internet for the purpose of viewing a 'special report' on the supplier's server when proper security constraints are satisfied. When the supplier's server is accessed, the buyer can view the 'special report' which illustrates a plurality of the buyer's field orders and a corresponding plurality of his invoices.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 9*a* through 12 illustrate the 'special report' which is generated by the supplier's server when the processor of the supplier's server executes the 'report generation software' which is resident on the supplier's server/computer, the 'special report' having a field order column associated with a description column and a corresponding invoice column, where a particular field order can be matched with a particular invoice associated with a particular product or service description;

FIGS. 14 through 18 are used in conjunction with the functional specification which describes the 'report generation software' illustrated in FIG. 13.

DETAILED DESCRIPTION OF THE INVENTION

Figure 1:
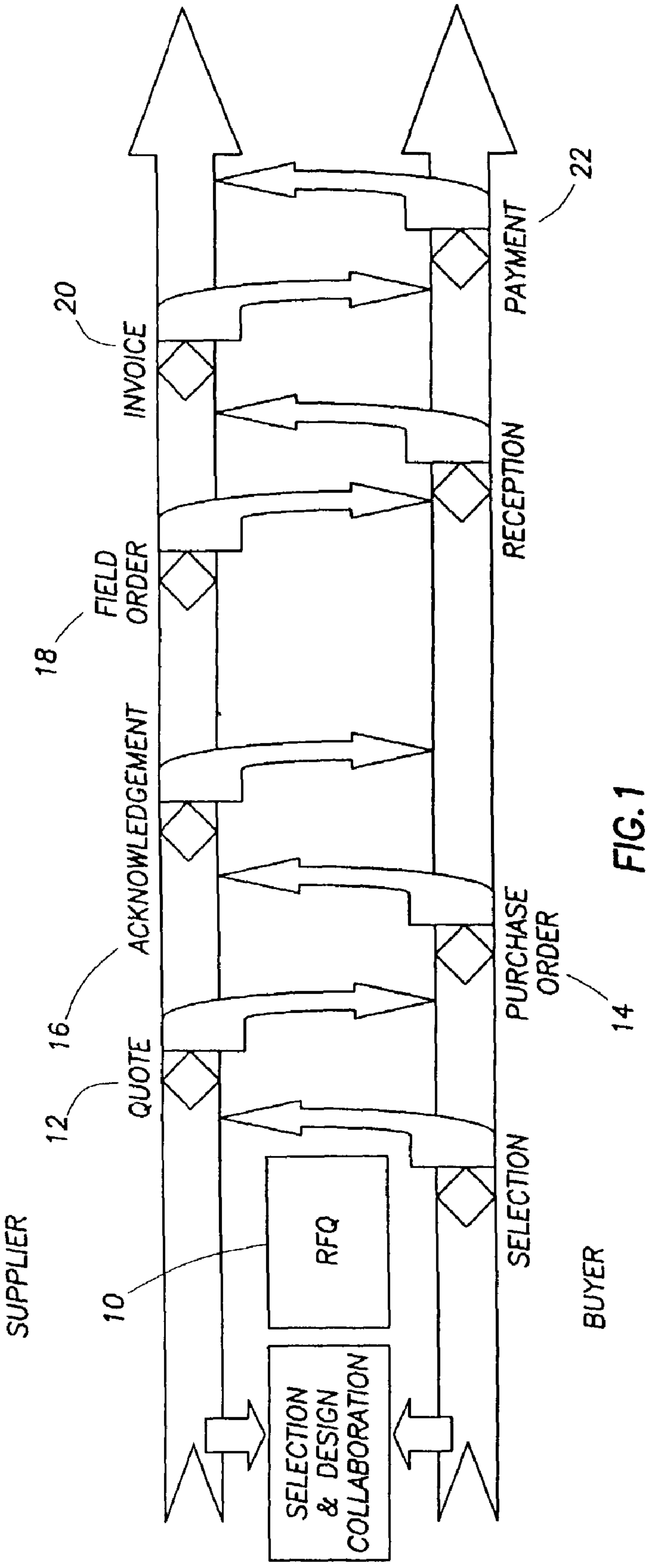
FIG. 1 illustrates a traditional procurement process.

Referring to FIG. 1, a traditional procurement process is illustrated.

In FIG. 1, traditionally, the procurement process includes the following steps. First, a definition of the buyer's needs results in the submission of a Request for Quotation (RFQ) 10 from a buyer to a supplier. This RFQ 10 may include products or services from the supplier's catalog, or, in the case of configurable products or services, the RFQ 10 may simply be a request for services that provide specified results. This creates a collaborative environment between buyer and supplier. The supplier sends a quote 12 that includes the price he can offer for the products or services. If they agreed on the price, the buyer replies by creating a Purchase Order (PO) 14 that identifies the items he wants to purchase. The supplier acknowledges the PO 16 and delivers products and or services which is documented by a job report 18, also known as a Field Service Report 18, a Field Order 18, or a Field Ticket (FT) 18 (hereinafter, known as a "Field Order 18"). The Field Order 18 document includes: the products/services delivered by the supplier to the buyer, and the prices provided by the supplier for each item. Particularly in a dynamic service environment, the services delivered and itemized on the Field Order 18 may vary significantly from those services which were originally requested. The Field Order 18 is reviewed by the supplier before the supplier generates an Invoice 20. An agreement between the Invoice 20 and the Field Order 18 represents one of the steps which are necessary in order to launch the payment process 22.

Figure 2:
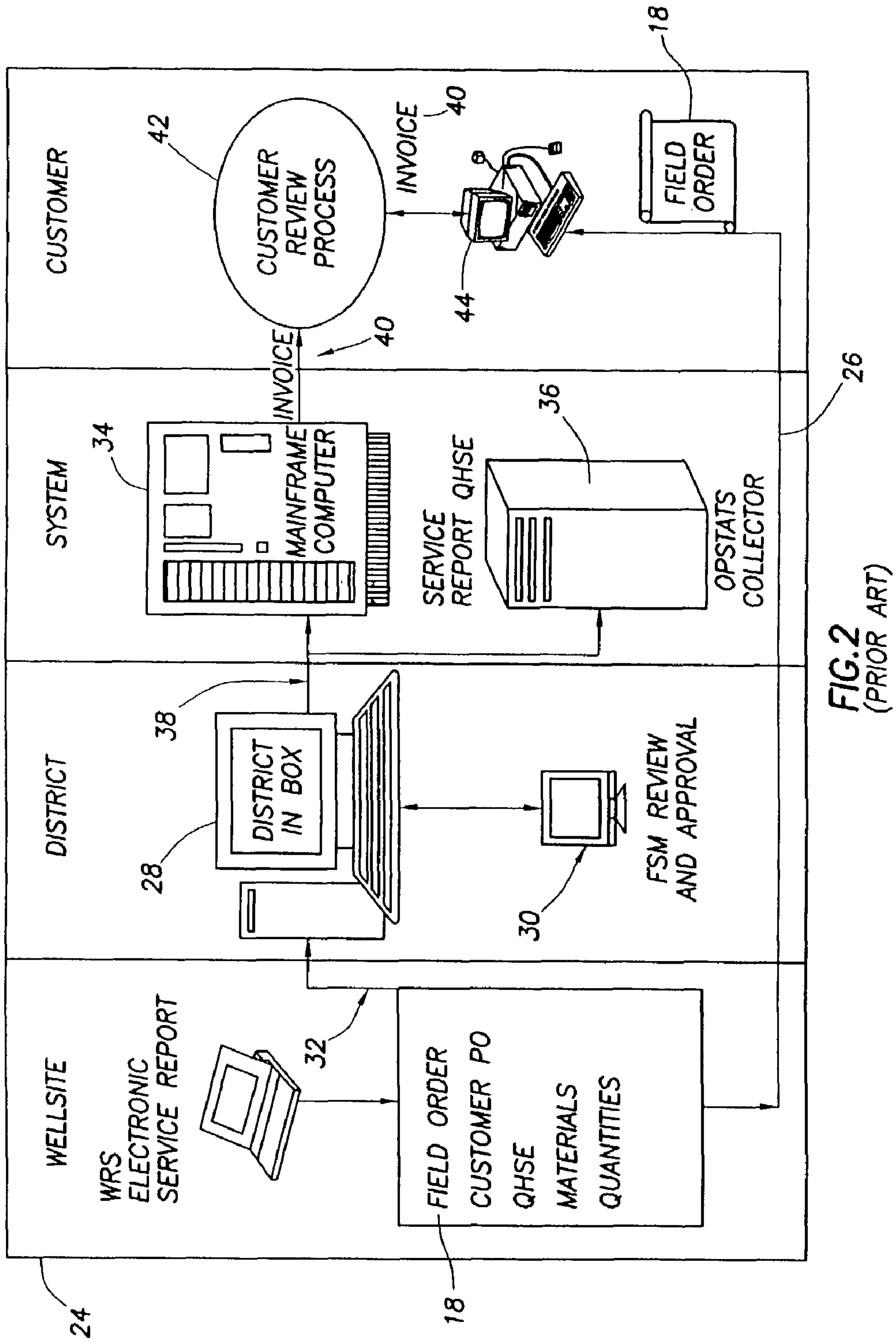
FIG. 2 illustrates a prior art method for collecting field orders (or 'field tickets')

Referring to FIG. 2, a prior art data collection method for collecting Field Order information and associated Invoice information is illustrated which enables a customer to match a Field Order with an incoming Invoice.

In FIG. 2, the prior art data collection method is comprised of the following steps. At a wellsite 24, when a supplier provides the requested goods and/or services to a buyer in response to a buyer's purchase order 14, a Field Order 18 is prepared which itemizes the goods and services delivered by the supplier to the buyer. The Field Order 18 is signed by the buyer when the goods and services are delivered to the buyer, and it includes such things as the customer purchase order (PO) number, quality health safety and environment (QHSE) information, a set of materials or services delivered, and the quantities of such materials delivered by the supplier to the buyer. A paper format of the Field Order 18 is delivered to the customer (note that this is a paper formatted field order only); see numeral 26 in FIG. 2. In the meantime, the Field Order 18, which represents the goods and services delivered by the supplier to the buyer and which is signed/verified by the buyer, is sent from the wellsite to a 'digital District Inbox' 28; see numeral 32 in FIG. 2. Here, a Field Service Manager (FSM) 30 reviews the Field Order 18 that is stored in the District InBox 28 for accuracy, since the Field Order 18 was originally prepared by a field engineer. When the Field Order 18 in the District InBox 28 is corrected by the FSM 30, a corrected Field Order 18 is sent to a mainframe computer 34 where the corrected Field Order 18 is stored therein; see numeral 38 in FIG. 2. The corrected Field Order 18 is also sent to an operational statistics (OpStats) collector 36. In response to the receipt of the corrected Field Order 18 from the District InBox 28, the mainframe computer 34 prepares an Invoice 40, where the Invoice 40 is delivered to a customer in order to initiate a process known as a "customer review process" 42. During the customer review process 42, the customer seated at computer terminal 44 in FIG. 2 will compare the received Invoice 40 with the customer's original copy of the Field Order 18 to verify that the items listed on the Field Order 18, representing the customer's received and verified goods and/or services, are accurately represented on the Invoice 40. However, in the prior art, the match between the Field Order 18 and the invoice 40 was an entirely manual process. As a result, the prior art data collection method illustrated in FIG. 2 is undergoing improvement by virtue of the new and novel data collection method in accordance with one aspect of the present invention illustrated in FIG. 6 and discussed in detail below.

Figure 3:
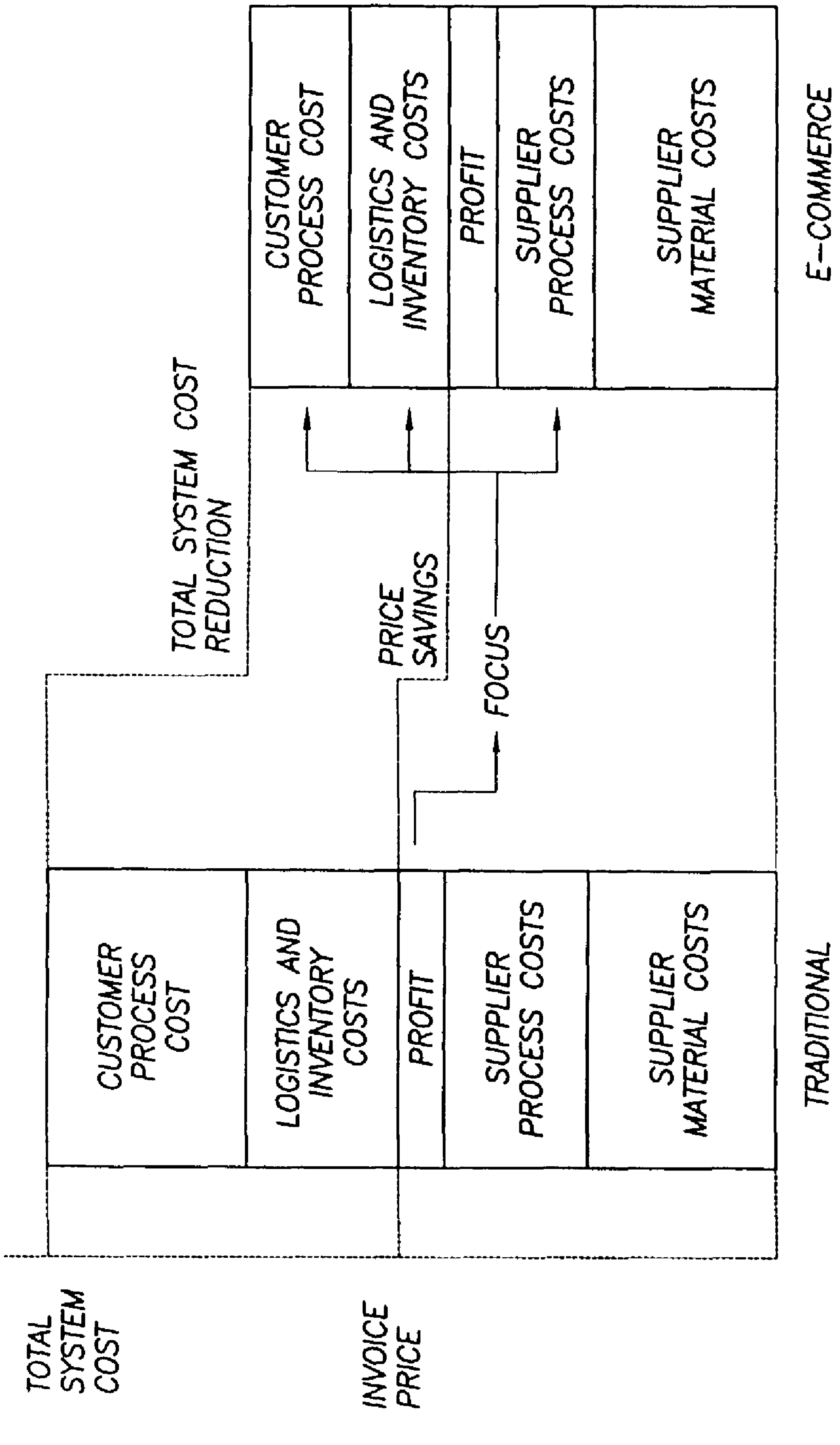
FIG. 3 illustrates how the method of the present invention for collecting field orders and corresponding invoices saves customer process costs and supplier process costs.

In FIG. 3, as noted earlier the prior art data collection method of FIG. 2 is undergoing improvement by virtue of the present invention; however, this improvement is needed in order to reduce the "total system cost". That is, the customer process costs can be reduced, and the supplier process costs can be reduced while maintaining the profit and the supplier material costs, as indicated in FIG. 3.

Figure 4:
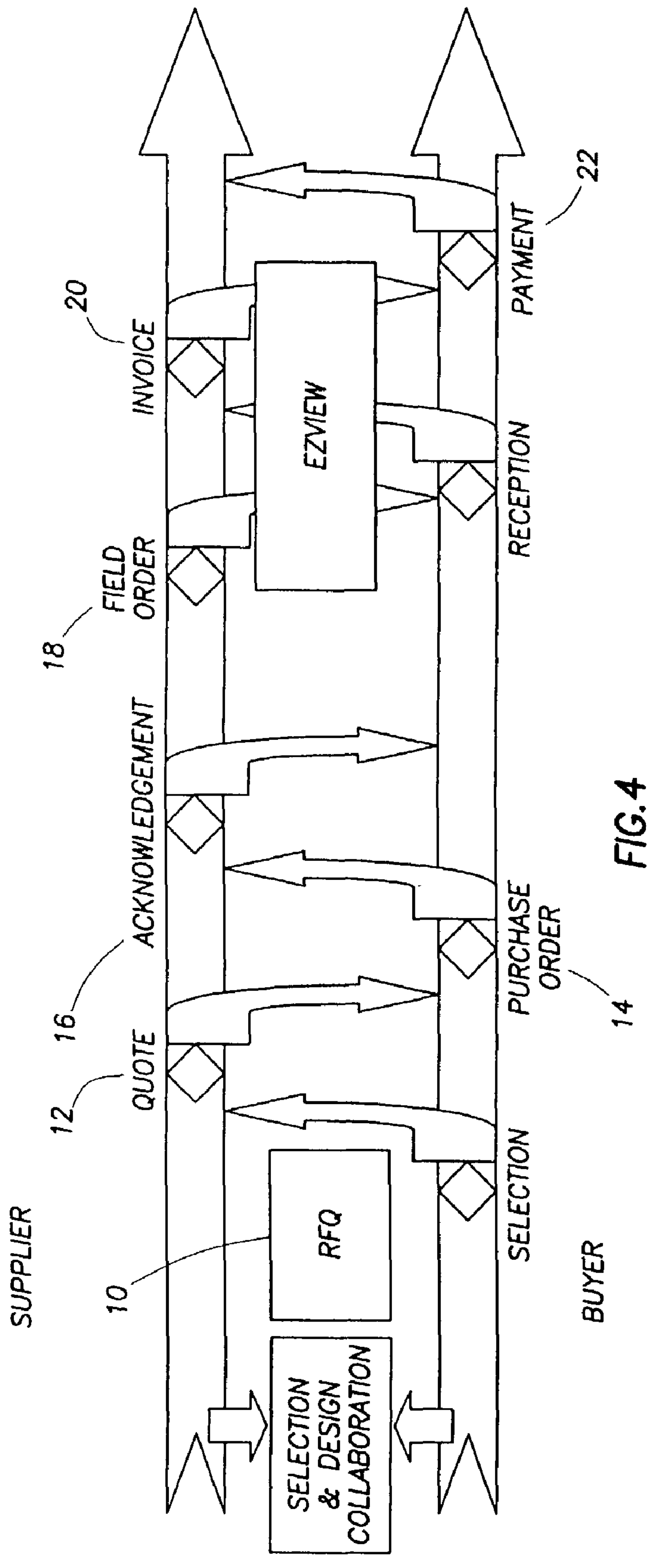
FIG. 4 illustrates the procurement process of FIG. 1, but this figure further illustrates where the 'eZView' software of the present invention operates in that procurement process for the purpose of saving the above customer and supplier process costs.

Referring to FIG. 4, the traditional procurement process of FIG. 1 is illustrated again, however, the 'report generation software' otherwise known as the 'eZView' software of the present invention (illustrated in FIG. 13) will generate the 'special report' as previously mentioned. That 'special report', which is generated by the 'eZView' software of the present invention, will illustrate, on a line-by-line basis, the Field Order 18 and its associated Invoice 20. After viewing the 'special report', the buyer will easily note that the items listed on the Field Order 18 are accurately reflected on the Invoice 20. Since the buyer is now reassured, the payment 22 for the goods and services listed on the Field Order 18 will be made by the buyer.

Figure 5:
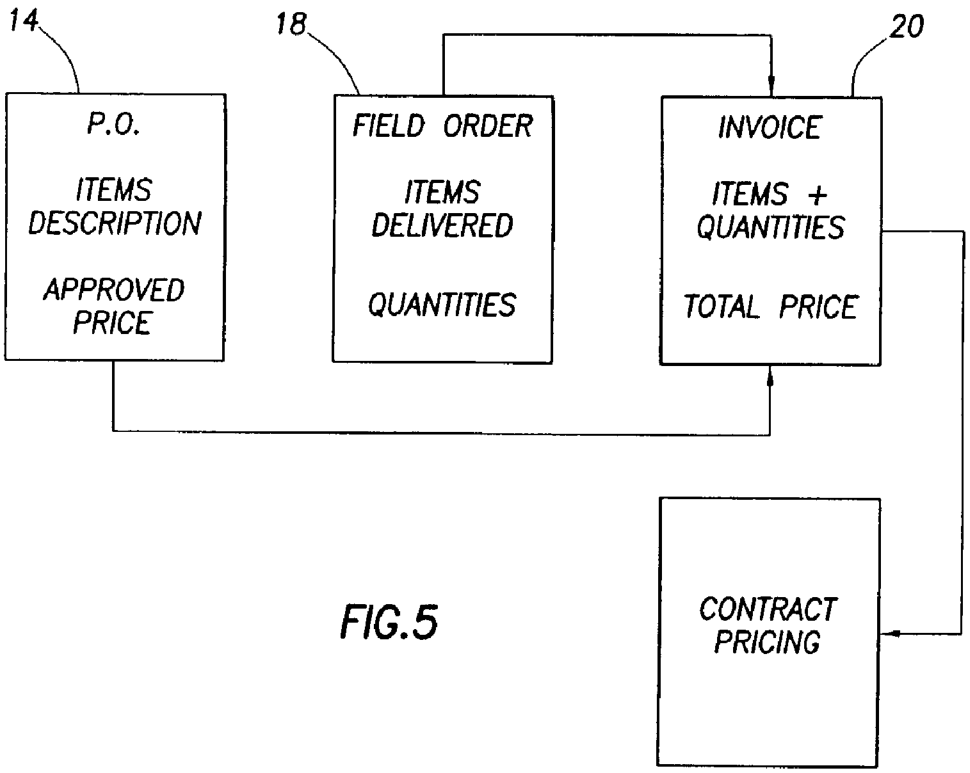
FIG. 5 illustrates the fact that the novel method for collecting field orders and associated invoices and the novel 'report generation software', also known as the 'eZView' software, not only captures a buyer's purchase order number and a buyer's invoice, but it also matches a buyer's field order (or field ticket) with the buyer's invoice; in addition, the unit prices in the invoice could also be compared with the corresponding unit prices as stated in the buyer's contract.

Referring to FIG. 5, the 'special report' that is generated by the 'report generation software' or the 'eZView' software of the present invention will enable the buyer to compare on a line-by-line basis: the Field Order 18 against the Invoice 20. More particularly, buyers are particularly concerned about passing an Invoice 20 through three levels of verification and authorization before authorizing payment to the supplier: (1) An invoice 20 must be related to one Purchase Order (PO); the total Invoice 20 value should remain within acceptable limits of an approved amount as stated in the Purchase Order (PO) 14; (2) Each invoice 20 must be compared with the Field Order (or Field Ticket) 18 that corresponds to that Invoice 20 in order to verify and determine the fact that the items and the quantities delivered to the buyer match with the items stated in the Invoice 20; and (3) The unit prices in the buyer's Invoice 20 should be compared with the buyer's agreed unit prices as stated in their contract with the supplier.

The 'report generation software' also known as 'eZview' software 'web application' of the present invention, addresses the two last points [that is, points (2) and (3) above] by providing customers with the opportunity to systematically compare Field Order 18 items and quantities against those stated in the Invoice 20, and to validate unit prices from the Invoice 20 against an electronic representation of the customer's contract.

Figure 6:
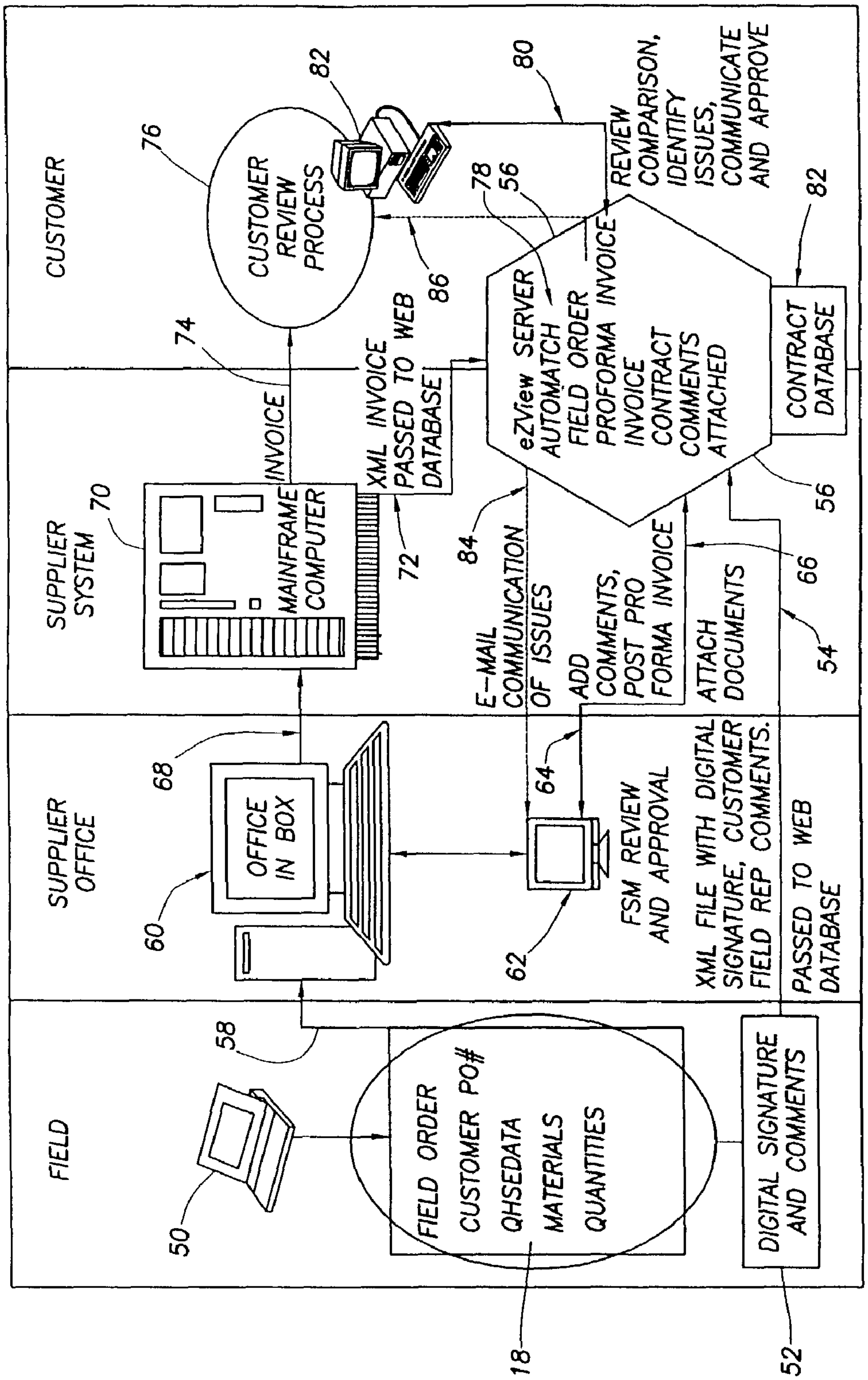
FIG. 6 illustrates the novel method in accordance with one aspect of the present invention for collecting field orders and collecting associated invoices for display of such field orders and such invoices on the 'special report' which is generated by the 'report generation software', also known as the 'eZView' software.

Referring to FIG. 6, a novel data collection method, in accordance with one aspect of the present invention, is illustrated for collecting the Field Orders 18 and the corresponding Invoices 20 of FIG. 4 so that the 'report generation software' (or the 'eZView' software), in accordance with another aspect of the present invention, can generate the aforementioned 'special report'. That 'special report' will display the Field Orders 18 and associated Invoices 20 on a line-by-line basis. As a result, by viewing the 'special report', the buyer can easily verify that the goods or services listed on the Field Order 18 (representing the goods and services which were delivered to the buyer and accepted by the buyer) do, in fact, accurately match the goods or services listed on the Invoice 20.

In FIG. 6, the novel data collection method for collecting Field Orders 18 and corresponding Invoices 20 comprises the following steps:

During a Field Operation, Collection and Viewing of a Field Order 18 Summary on a Field Engineer's Laptop Referring to FIG. 6, locate a field engineer's laptop 50. The laptop 50 will display a Field Order 18. The Field Order 18 represents a set of goods or services which were delivered by a supplier to a buyer in the field. The Field Order 18 displayed on laptop 50 reflects those goods or services.

Figure 13:
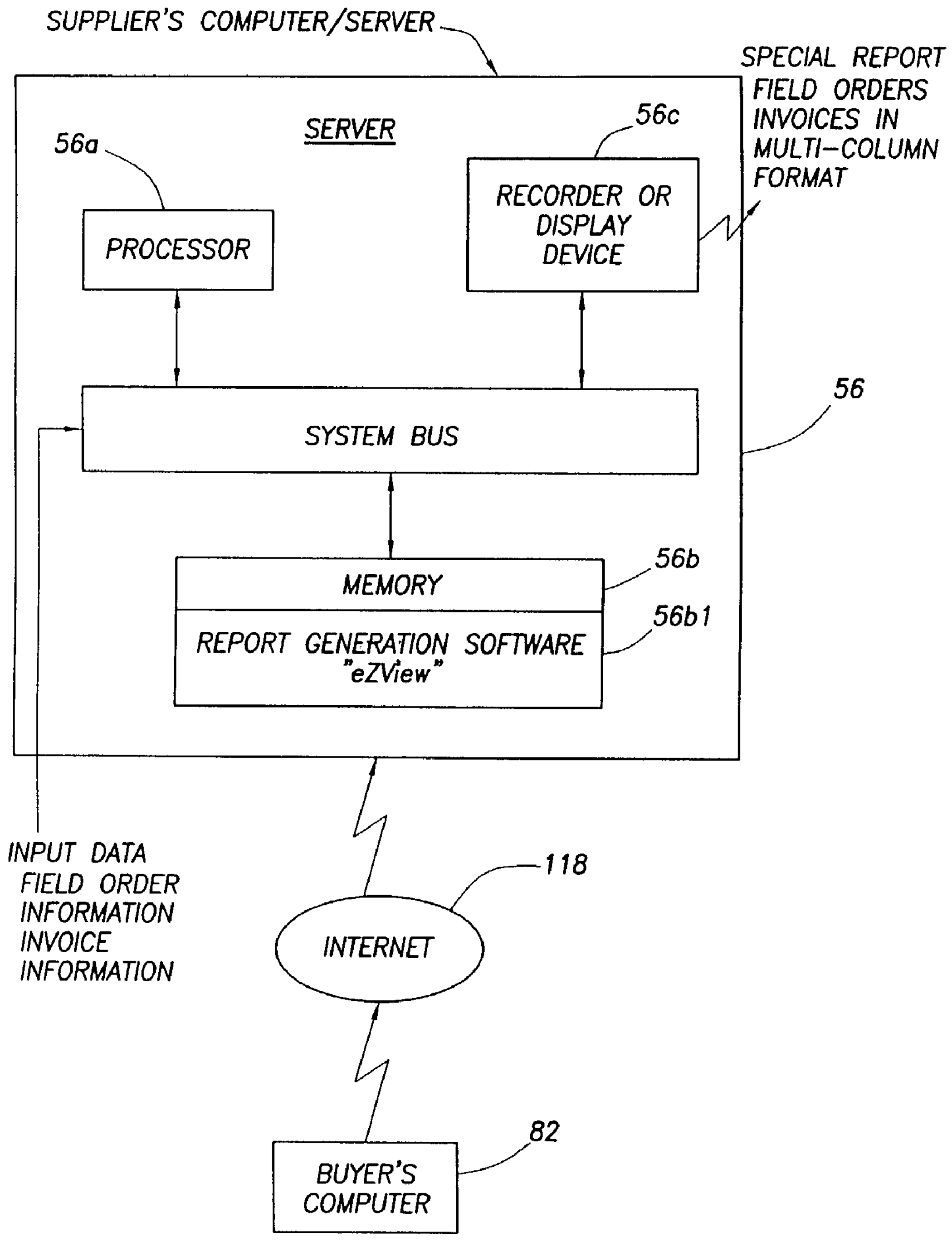
FIG. 13 illustrates a construction of the supplier's server which stores the 'report generation software', otherwise known as the 'eZView' software in accordance with another aspect or feature of the present invention.

Generation of an XML Version of the Field Order 18 and Locking of the XML Field Order 18 by Capturing the Customer Field Representative's Digital Signature; in Addition, Capture the Customer Field Representative's Comments by Posting the Comments on the 'eZView' Server Illustrated in FIG. 13

In FIG. 6, locate the 'Digital Signature and Comments' block 52. Recall that the Field Order 18, which is displayed on the field engineer's laptop 50, comprises a customer purchase order 14 number, QHSE data, material delivered to the buyer, and quantities of the aforesaid materials delivered to the buyer. When the goods and/or services are delivered by the supplier to the buyer, the Field Order 18 will state exactly which goods were delivered to the buyer along with their quantities, and the Field Order 18 will also state exactly which services were delivered to the buyer. When the goods and/or services are delivered by the supplier to the buyer, the buyer's "Customer Field Representative" will review the Field Order 18 which is being displayed on the laptop 50 and the "Customer Field Representative" will indicate his acceptance of the goods and/or services delivered by the supplier to the buyer by supplying a unique 'digital signature' 52 which is unique to the Customer Field Representative. If the buyer's Customer Field Representative has any comments regarding the delivered goods and/or services, those comments 52 can also be supplied by the Customer Field Representative along with his 'digital signature' 52.

Transfer the XML Version of the Signed Field Order 18 to the 'eZView' Server.

In FIG. 6, locate numeral 54. Here, the XML version of the Field Order 18 is being transferred from the laptop 50 to the 'eZView' server 56.

Transfer of the Field Order 18, in Electronic Form, to the Service Company's Field Operation's Office for Additional Review and Editing.

In FIG. 6, locate numeral 58. Here, the Field Order 18 in laptop 50 is transferred, in electronic form, to a Service Company's Field Operations office 60, called the 'office InBox' 60, for additional review and editing of the field order 18 by a Field Service Manager (FSM) 62. The field engineer's field order 18 in laptop 50 may contain errors. The Field Service Manager 62 will correct those errors in the field order 18.

Correction and Modification of Field Order 18 by the Supplier's Field Operations Manager and Capturing Supplier Comments Associated the Field Order or Invoice Items In FIG. 6, locate numeral 64. Note that the Field Service Manager (FSM) 62 will review the Field Order 18 now stored in the 'Office In Box' 60 and correct any errors. Here, the FSM 62 can place any comments as desired directly on the Field Order 18 being displayed on the 'Office In Box' 60, the comments being associated with the Field Order 18 or any Invoice items.

Posting of a Pro Forma Invoice and Attaching Supporting Documents.

In FIG. 6, locate numeral 66. Here, the FSM 62 can also create an unofficial (Pro Forma) invoice and store that invoice in the 'eZView' server 56. In addition to the unofficial 'Pro Forma' invoice, the FSM 62 can also attach any other supporting documents to the invoice that is being stored in the 'eZView' server 56, the attachment of the documents to the invoice being done in a manner that is similar to attaching a document to an email.

Transfer Field Order 18 to a Mainframe Computer for Storage therein for the Purpose of Creating an Invoice In FIG. 6, locate numeral 68. The Field Order 18 which is currently stored in the 'Office In Box' 60 is now transferred to a mainframe computer 70 for storage therein. In the mainframe computer 70, the Field Order 18 is used to create an official copy of an Invoice that corresponds to the Field Order 18 that is stored in the mainframe computer 70 and in the 'Office In Box' 60.

Capturing an XML Representation of the Invoice and Passing the Invoice to the 'eZView' Server 56

In FIG. 6, locate numeral 72. Here, an XML representation of the Invoice stored in the mainframe computer 70 is transferred to a web database in the 'eZView' server 56.

Deliver the Traditional Invoice to the Customer

In FIG. 6, locate numeral 74. Here, a traditional copy of the Invoice, which is stored in the mainframe computer 70, is delivered to the buyer/customer for his review. Locate numeral 76 and note that, at this point, a 'customer review process' 76 will begin. During the customer review process 76, the buyer/customer will review the invoice which was previously delivered to the buyer/customer, at numeral 74.

Automatch between the Field Order and Invoice, or Field Order and Pro Forma Invoice, or Pro Forma Invoice and Invoice, Matching Line Item Materials and Quantities; Identify Items that do not Match or are not Digitally Signed; Automatically email Notifications to a Customer Indicating that an Invoice has been posted to the 'eZView' Server In FIG. 6, locate numeral 78. Here, using his own personal computer and standard browser software, the buyer/customer can access the access the internet for the purpose of accessing the 'eZView' server 56, as shown in FIG. 13. When access to the 'eZView' server is achieved, the buyer/customer can perform the following functions: The buyer/customer can initiate an 'automatch' function wherein the buyer can enter a Field Order number or an invoice number, and, responsive thereto, the buyer can start performing an 'automatch' function. During the 'automatch' function, the server 56 can: (1) locate a match between the Field Order and the Invoice, or (2) locate a match between the Field Order and the Pro Forma Invoice, or (3) locate a match between the Pro Forma Invoice and the Invoice. The server 56 can also identify items, during the 'automatch' function, that do not match or are not digitally signed. In addition, the server 56 can automatically notify a buyer/customer via email indicating that an invoice has been posted to the 'eZView' server 56. When the 'automatch' function is complete, a 'special report' is generated by the server 56. That 'special report' will be discussed below with reference to FIGS. 9*a*, 9*b*, 10, 11, and 12.

Customer has a Secure Access via a Web Browser into the 'eZView' Server 56 for Performing the 'Automatch' Function and Reviewing Matches between Field Orders and Invoices, and Reviewing Supplier Comments and Supporting Attachments In FIG. 6, locate numeral 80. Here, a buyer/customer, sitting at his personal computer 82, can access the internet and attempt to access the 'eZView' server 56. When access to the 'eZView' server 56 is obtained, the buyer/customer can then: enter an invoice number or a field order number, and start performing the 'automatch' function. When the automatch function is completed, a 'display' or 'output record medium' is generated. In that 'display' or 'output record medium', a match between a field order 18 and an invoice 20 can be displayed (see FIGS. 9 through 12). Alternatively, a match between the Field Order and the Pro Forma Invoice can be displayed, or a match between the Pro Forma Invoice and the Invoice can be displayed. FIGS. 9*a* through 12 are examples of a 'display' or 'output record medium' which shows a match between a plurality of field orders and a corresponding plurality of invoices for a corresponding plurality of product or service descriptions. In addition, when the buyer has obtained access to the 'eZView' server 56 and the 'automatch' function has completed, the buyer can also review, on the 'display' or 'output record medium', any supplier's comments and any supporting attachments which may exist.

Unit Price Verification Against Specific Contract in Contract Database

In FIG. 6, locate numeral 82. Recall that, with reference to numeral 72 in FIG. 6, the XML representation of the Invoice stored in the mainframe computer 70 was transferred to a web database in the 'eZView' server 56. Recall again that, with reference to numeral 78, the buyer/customer performs an 'automatch' function wherein a 'display' or 'output record medium' is generated; and, in that 'display' or 'output record medium', a match between a field order 18 and an invoice 20 can be displayed, or a match between the Field Order and the Pro Forma Invoice can be displayed, or a match between the Pro Forma Invoice and the Invoice can be displayed. A 'contract' between the buyer and the supplier is stored in a 'contract database' 82 of FIG. 6. Now that the buyer/customer has obtained access to the 'eZView' server 56 and has performed the 'automatch' function, the buyer/customer, sitting at his personal computer 82, can also compare the unit prices set forth in the Invoice which is stored in the 'eZView' server 56 with the unit prices set forth in the buyer/supplier contract stored in the contract database 82.

Customer can Initiate email Back to Supplier for Issue Resolution.

In FIG. 6, locate numeral 84 representing a route 84. Here, since the buyer/customer sitting at his personal computer 82 has obtained access to the 'eZView' server 56, has performed the 'automatch' function, and has generated the 'display' or 'output record medium' in the form of a 'special report' similar to the special reports illustrated in FIGS. 9*a* through 12, the buyer/customer may now have one or more questions concerning any of the field orders 18 and corresponding invoices 20 set forth in the 'special reports' of FIGS. 9*a* through 12. As a result, the buyer/customer can now send an email containing his questions back to the supplier via route 84 in FIG. 6. This email is sent back to the supplier's Field Service Manager (FSM) 62 in FIG. 6. The FSM 62 would answer those questions.

Customer can Initiate email Notification to inside Own Organization to Support Workflow Process.

In FIG. 6, locate numeral 86 representing route 86. Here, since the buyer/customer sitting at his personal computer 82 has obtained access to the 'eZView' server 56, has performed the 'automatch' function, and has generated the 'display' or 'output record medium' in the form of a 'special report' similar to the special reports illustrated in FIGS. 9*a* through 12, the buyer/customer may want to notify his own organization in order to support the workflow process. As a result, via route 86 in FIG. 6, the buyer/customer can send an email to his own organization set forth in the 'customer review process' block 76 in order to implement the needed workflow.

Figure 7:
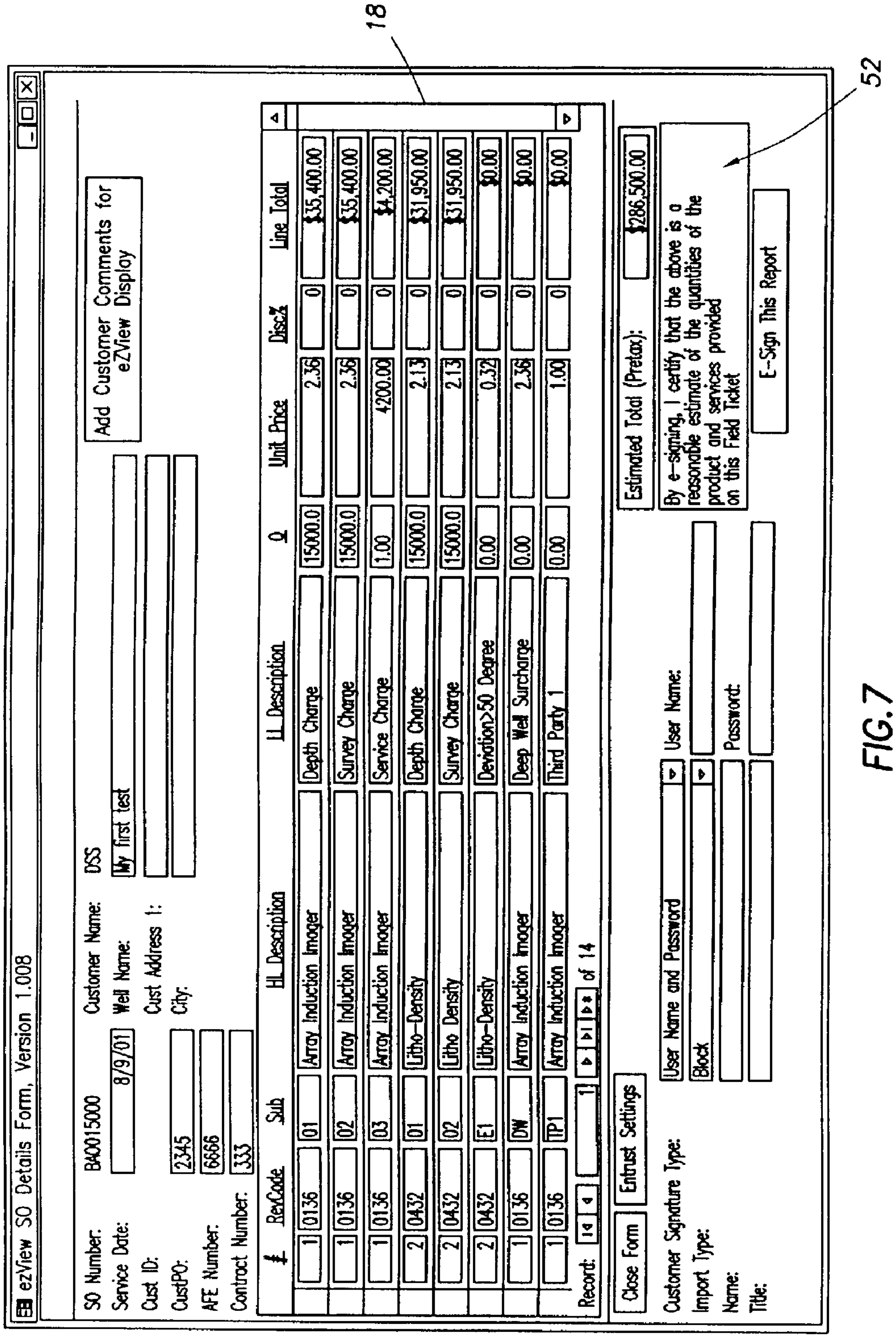
FIG. 7 illustrates a typical field order, which is also known as a field ticket or a service order.

Referring to FIG. 7, a typical Field Order 18, also known as a field ticket or a service order, is illustrated.

In FIG. 7, recall from FIG. 6 that a Field Order 18 was generated in the supplier/field engineer's laptop 50 indicating that the supplier delivered the required goods and/or services. Recall also in FIG. 6 that the buyer's representative was required to provide his 'digital signature' 52 on the Field Order 18 indicating his acceptance of the goods and/or services provided by the supplier to the buyer. FIG. 7 illustrates an example of a Field Order 18 which could be displayed on the field engineer's laptop 50 and which contains the buyer's 'digital signature' 52 (here, we are digitally signing the document using PKI technology—there is not a viewable signature as such). In FIG. 7, that 'digital signature' 52 can be seen in the lower right hand corner of FIG. 7.

Figure 8A:
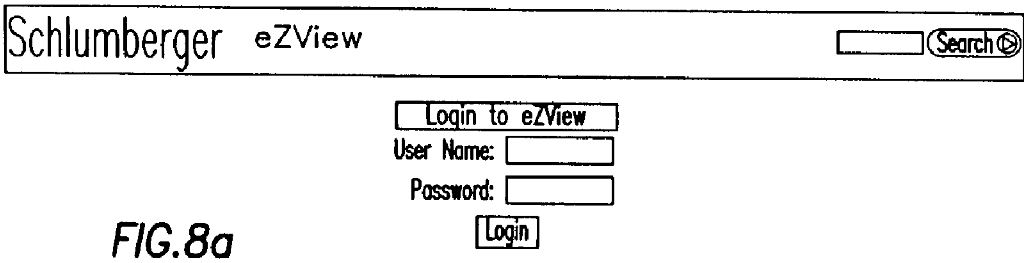
FIGS. 8*a* and 8*b* illustrate a screen display which is being viewed by a buyer on the buyer's computer, when the buyer is attempting to access the supplier's server via the internet, this screen display requiring the buyer to first enter a security constraint, such as a username and a password, and then, when the username and password is successfully entered, requiring the buyer to enter an invoice number and/or a field ticket number.
Figure 8B:
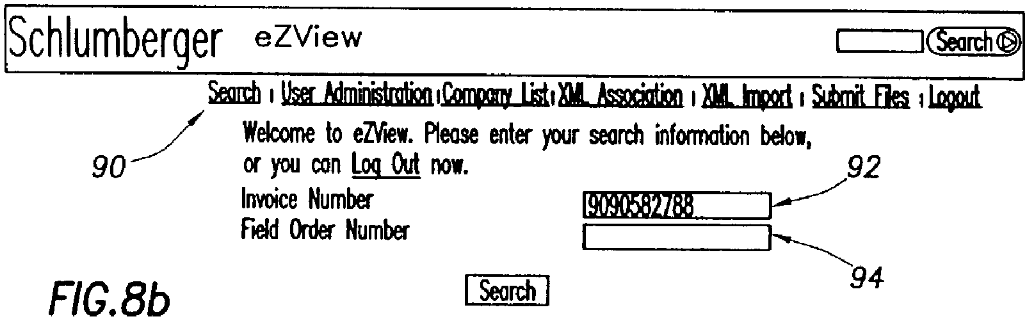

Referring to FIGS. 8*a* and 8*b*, recall from FIG. 6 that a buyer/customer, sitting at his personal computer 82, can access the 'eZView' server 56 by first accessing the internet. When the server 56 is accessed, an 'automatch' function is initiated by the buyer/customer.

In FIG. 8*a*, the buyer/customer is first asked to supply his username and password and click the 'login' icon before the 'automatch' function can begin.

In FIG. 8*b*, when the buyer's username and password is supplied and the login icon is clicked, the buyer/customer will then supply either an invoice number 92 and/or a field order number 94 and then click on the word 'search' 90. When the 'search' word 90 is clicked in FIG. 8*b*, the 'automatch' function begins its operation.

Referring to FIGS. 9*a* through 12, a plurality of 'special reports' are illustrated, these 'special reports' being generated by the processor of the 'eZView' server 56 when the 'report generation software', otherwise known as the 'eZView' software, is executed by the processor of the 'eZView' server 56 (see FIG. 13 for an illustration of the 'eZView' server 56 and its associated processor and its 'eZView' software stored in memory).

In FIGS. 9*a*-9*b*, an example of the 'special report' is illustrated. The most important part of the 'special report' pertains to the fact that the Field Order 18 column 96 is immediately adjacent the Invoice column 98 on the 'special report' and, for any one line 100 on the 'special report', information concerning a particular Field Order 100*a* is immediately adjacent other information concerning a particular Invoice 100*b* that corresponds to that particular Field Order 100*a*. In other words, in FIGS. 9*a*-9*b*, since the Field Order 100*a* representing receipt by the buyer of a particular set of goods and/or services corresponds to Invoice 100*b* representing payment of certain money due the supplier for the aforementioned particular set of goods and/or services, it is highly desirable that the Field Order 100*a* information in FIGS. 9*a*-9*b* be located immediately adjacent its associated Invoice 100*b* information in FIGS. 9*a*-9*b*. In FIGS. 9*a*-9*b*, it is noted that a description 102 of the goods and/or services delivered by the supplier to the buyer is also illustrated; as a result, in FIGS. 9*a*-9*b*, for a particular set of goods and/or services 100*c*, a particular Field Order 100*a* was delivered to the buyer which was acknowledged by the buyer (in the form of the 'digital signature' 52 in FIG. 6), and a particular Invoice 100*b* was also delivered to the buyer/customer. When the 'automatch' function is completed, the 'special report' in FIG. 9 is generated by the processor of the server 56 in FIGS. 6 and 13, that 'special report' allowing the buyer/customer to easily see and verify the fact that certain goods and/or services 100*a* were delivered by the supplier to the buyer and a particular invoice 100*b* associated with those goods and/or services was delivered to the buyer setting forth amounts of money due the supplier for those goods and/or services.

Figure 10:
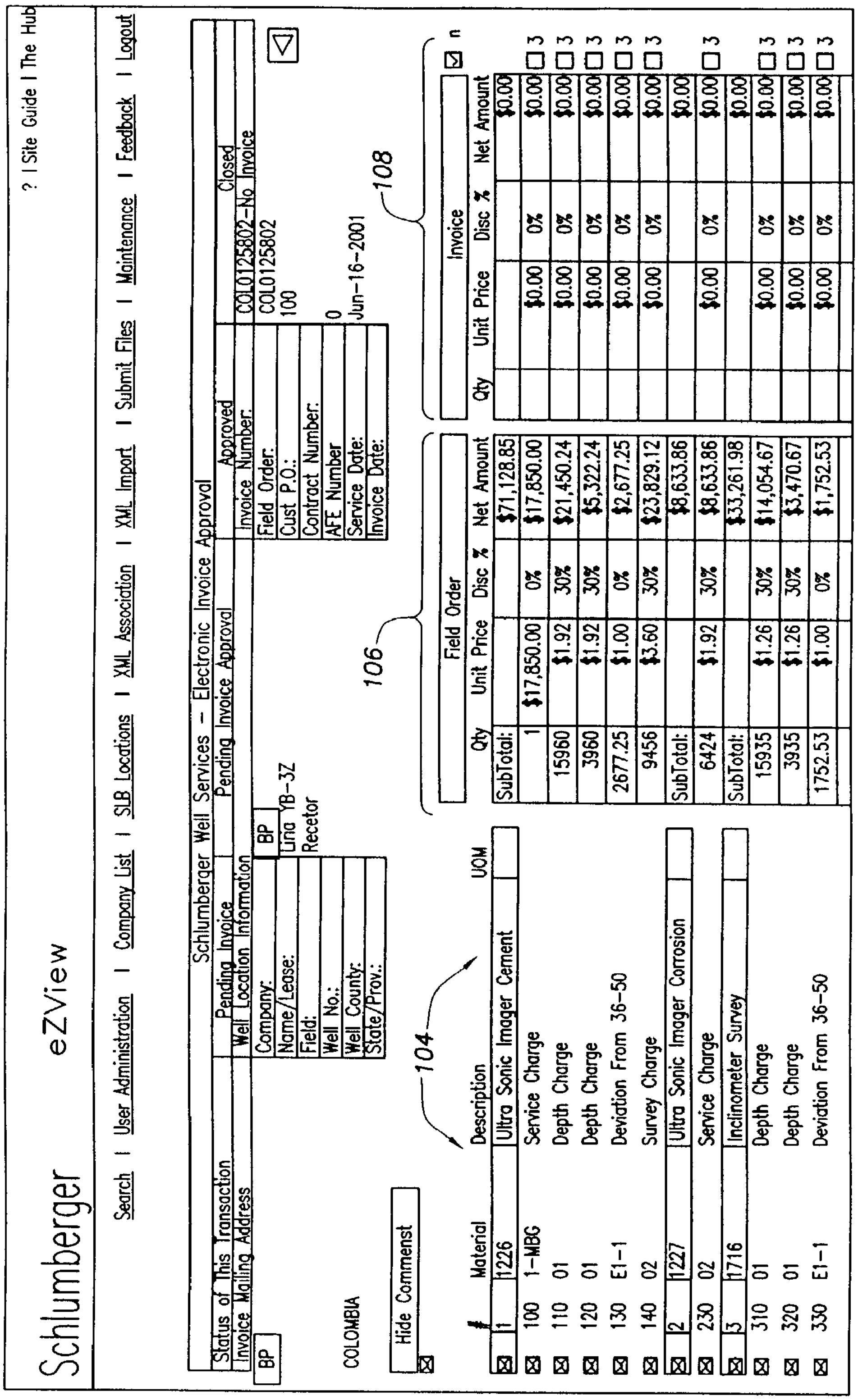
Figure 11:
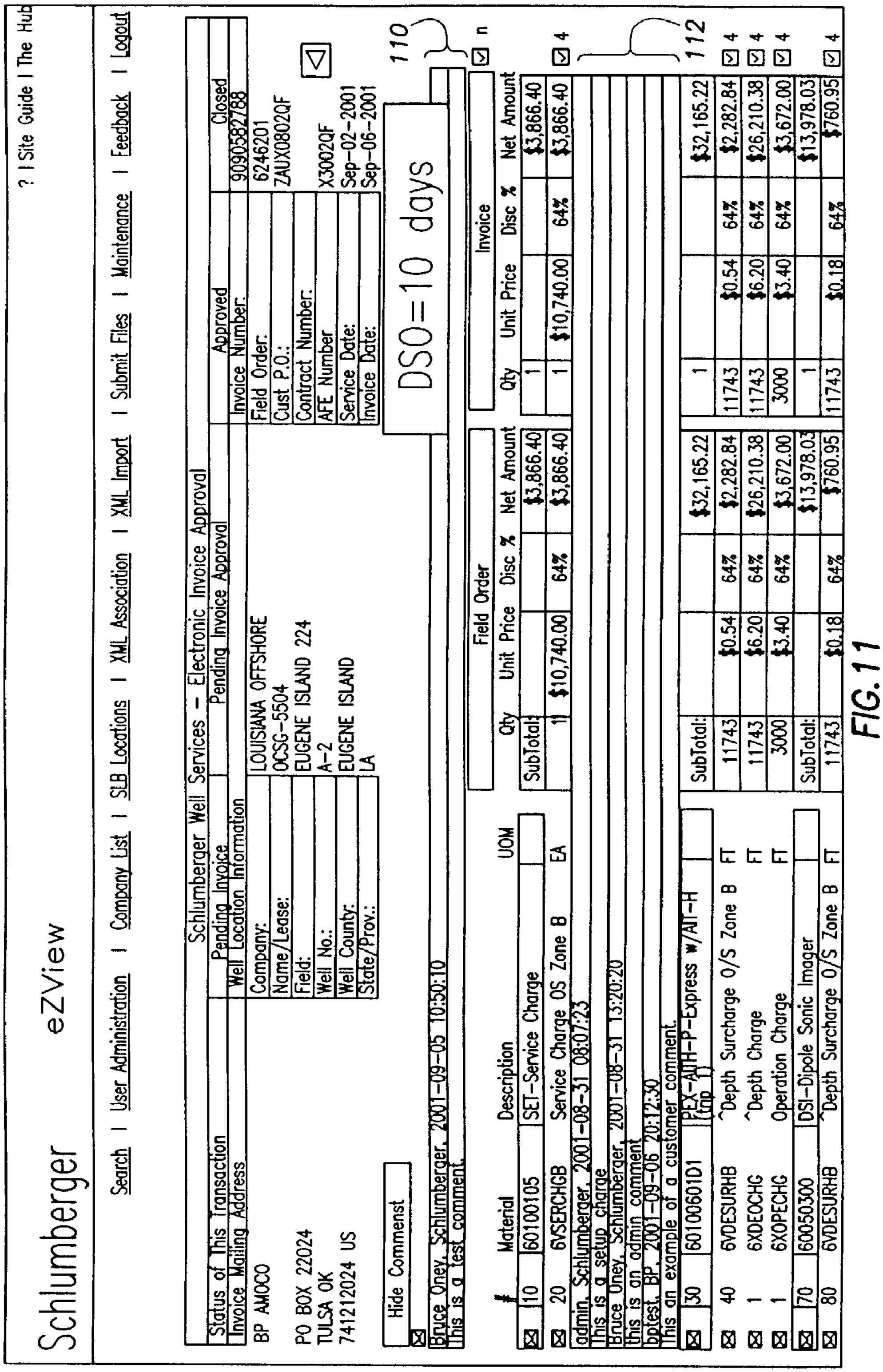

FIGS. 10, 11, and 12 illustrate other examples of the 'special report' which includes a Field Order 18 column including a plurality of Field Orders, and an Invoice column 20 including a plurality of Invoices which correspond, respectively, to the plurality of Field Orders in the Field Order column.

In FIG. 10, for example, column 104 includes a description of a plurality of goods and/or services which were delivered by the supplier to the buyer. Column 106 represents a plurality of Field Orders 18 which correspond, respectively, to the plurality of goods and/or services in the description column 104. Recall that the Field Orders 18 resemble the Field Order 18 in FIG. 7 of the drawings containing a digital signature 52. Column 108 represents a plurality of Invoices 20 which correspond, respectively, to the plurality of Field Orders in column 106. The 'special report' shown in FIG. 10 was generated by the 'report generation software' (i.e., the 'eZView' software) when the 'automatch' function was executed.

In FIGS. 11 and 12, the 'special reports' shown in FIGS. 11 and 12 are identical in format to the 'special reports' shown in FIGS. 9 and 10; however, in FIGS. 11 and 12, a plurality of comments are displayed. The comments may originate from the buyer when the buyer questions a particular amount on an invoice, or a comment may originate from the supplier when an explanation of an amount or a service is needed. For example, in FIG. 11, comments 110 and 112 are illustrated. In FIG. 12, comments 114 and 116 are illustrated.

Referring to FIG. 13, a more detailed construction of the 'eZView' server 56 in FIG. 6 is illustrated. In FIG. 13, the supplier's server 56 (i.e., the 'eZView' server 56) of FIG. 6 includes a processor 56*a*, a memory 56*b*, and a recorder or display device 56*c*. The memory 56*b* stores the 'report generation software' also known as the 'eZView' software 56*b*1. The memory 56*b* is a computer readable medium and a program storage device, the contents of which are readable by a processor or other machine, such as the processor 56*a*. The processor 56*a* may be, for example, a microprocessor, microcontroller, or a mainframe or workstation processor. The memory 56*b*, which stores the 'report generation software' or 'eZView' software 56*b*1, may be, for example, a hard disk, ROM, CD-ROM, DRAM, or other RAM, flash memory, magnetic storage, optical storage, registers, or other volatile and/or non-volatile memory. When the processor 56*a* executes the 'report generation software' 56*b*1, the 'special report' is generated by the recorder or display device 56*c*. Recall that a buyer, at the buyer's personal computer 82 attempts to access the supplier's server 56 via the internet 118. When the server 56 is accessed, when the username and password of FIGS. 8*a* and 8*b* are supplied, the 'automatch' function is initiated, whereupon the 'special report' of FIGS. 9-12 is generated enabling the buyer to view one or more field orders 18 and their corresponding invoices 20.

In operation, with reference to FIGS. 1 through 13 of the drawings, when a buyer/customer orders goods and/or services, those goods and/or services are delivered by a supplier to a buyer. When those goods and/or services are delivered by the supplier to the buyer, the buyer will indicate acceptance of the goods and/or services by signing a Field Order 18 in FIG. 4 or 5. In FIG. 6, the buyer can view the Field Order 18 on a field engineer's laptop 50, the Field Order 18 including such things as buyer purchase order number, materials and quantities. In FIGS. 6 and 7, the buyer indicates his official acceptance of the goods and/or services by providing his 'digital signature' 52. An XML version of the 'signed Field Order' 18 is then transmitted to the 'eZView' server 56 in FIG. 6. In addition, in FIG. 6, the 'signed Field Order' 18 is also transmitted to the supplier's Field Operations office, the 'Office In Box' 60 in FIG. 6, for additional review and editing of the 'signed Field Order' 18. The supplier, viewing the 'signed Field Order' 18 in the 'Office In Box' 60, can attach any supplier comments and attach any supporting documentation to the 'signed Field Order' 18, in the manner illustrated in the example Field Orders illustrated by comments 110, 112, 114, and 116 in FIGS. 11 and 12. In addition, the supplier's Field Operations office 60 in FIG. 6 can also transmit a 'pro forma' invoice along with any other associated supporting documents to the supplier's server 56 in FIG. 6. In the meantime, a 'signed and edited Field Order' 18 is transferred from the 'office In box' 60 in FIG. 6 to a mainframe computer 70 in FIG. 6 for the purpose of creating an 'official Invoice'. Now that the 'official invoice' has been created in the mainframe computer 70, an XML representation of the 'official invoice' is transmitted from the mainframe computer 70 to the 'eZView' server 56 in FIG. 6. In addition, a 'traditional invoice' is also transmitted from the mainframe computer to the buyer/customer. Assume that the buyer/customer, having the 'traditional invoice' in his hand, wants to see the 'particular Field Order' 18 that corresponds to the 'traditional invoice' in order to match the goods/services on the 'particular Field Order' 18 with the goods/services on the 'traditional invoice'. Consequently, in order to see the 'particular Field Order' 18, the buyer/customer, sitting at his personal computer 82 in FIGS. 6 and 13, accesses the internet 118 in FIG. 13 and then accesses the supplier's server 56 in FIG. 6. As illustrated in FIGS. 8*a* and 8*b*, the buyer/customer provides his username and password (FIG. 8*a*) and the buyer also provides an invoice number 92 and/or a Field Order number 94 (FIG. 8*b*). At this point, the buyer clicks the "Search" icon 90 in FIG. 8*b*. When the "search" icon 90 in FIG. 8*b* is clicked-on by the buyer, the 'automatch' function is immediately initiated. During the execution of the 'automatch' function, the Field Order number 94 in FIG. 8*b* is automatically matched with its associated 'official invoice' stored in the server 56, or, alternatively, the Invoice number 92 in FIG. 8*b* is automatically matched with its associated Field Order 18 stored in the server 56. When a match is found, between the Field Order number 94 and its 'official invoice' or between the Invoice number 92 and its Field Order, the 'special report' of FIG. 9*a*-9*b*, 10, 11, or 12 is generated. Note in FIGS. 9*a*-9*b* that the 'special report' has three columns: a first column having one or more descriptions of the goods and/or services, a second column having one or more Field Orders corresponding, respectively, to the one or more descriptions of the goods and/or services, and a third column having one or more invoices corresponding, respectively, to the one or more field orders under the second column. As noted in FIGS. 9*a*-9*b*, each Field Order 18 is printed directly adjacent to its 'official invoice'; as a result, the buyer can now easily see and verify the fact that the goods/services listed on the Field Order 18 do, in fact, match with the goods/services listed on the 'official invoice'. For example, in FIGS. 9*a*-9*b*, under "Field Order", a quantity, unit price, and net amount is printed, whereas, under "Invoice", a quantity, unit price, and net amount is also printed. The quantities, unit prices, and net amounts should match between the Field Order 18 and the Invoice 20 on the 'special report' illustrated in FIGS. 9*a* through 12. If items do not match, or if the Field Order was not digitally signed, these discrepancies will be noted on the 'special report'. In addition, the unit prices appearing in the 'special report' will be matched with the unit prices appearing in the supplier/buyer contract stored in the contract database 82. The buyer/customer, viewing the 'special report' on his personal computer 82, can also email the supplier's Field Operations Manager 62 in FIG. 6 (via route 84 in FIG. 6) to resolve any remaining issues.

A detailed construction of the 'report generation software' 56*b*1, also known as the 'eZView' software 56*b*1, of FIG. 13 is set forth below in the form of a Functional Specification. That Functional Specification of the 'report generation software' 56*b*1 is provided in detail below, as follows:

Functional Specification of the 'Report Generation Software' 56*b*1

Refer now to FIGS. 14 through 18 of the Drawings.

Oil & Gas (O&G) companies are attempting to improve supply chain execution tasks by leveraging web-based functionality. Clearly today there are a number of areas where cycle time and administrative costs can be reduced by having better accessibility to the right documents at the right decision levels between Schlumberger and these companies. An immediate focus is an electronic invoice approval process, in which Schlumberger invoices can be processed and approved on-line by O&G Company customers, potentially reducing payment delays and administrative work.

In general terms, each O&G Company would like to pass a Schlumberger invoice through three levels of verification and authorization before proceeding with payment.

1) Each invoice must refer to a specific purchase order (PO) number, and the total invoice value must be within acceptable limits of an approved amount that is explicitly stated in the reference PO.
2) Each invoice then has to be compared with a Field Service Report (also called Field Ticket or Delivery ticket) in order to verify items and quantities of products or services rendered.
3) Finally, unit prices, as expressed in each invoice, must be verified against agreed prices, which are typically itemized on a contract basis.

The purpose of the eZView application is to allow Customers web access to compare Field orders and final Invoices.

Figure 14:
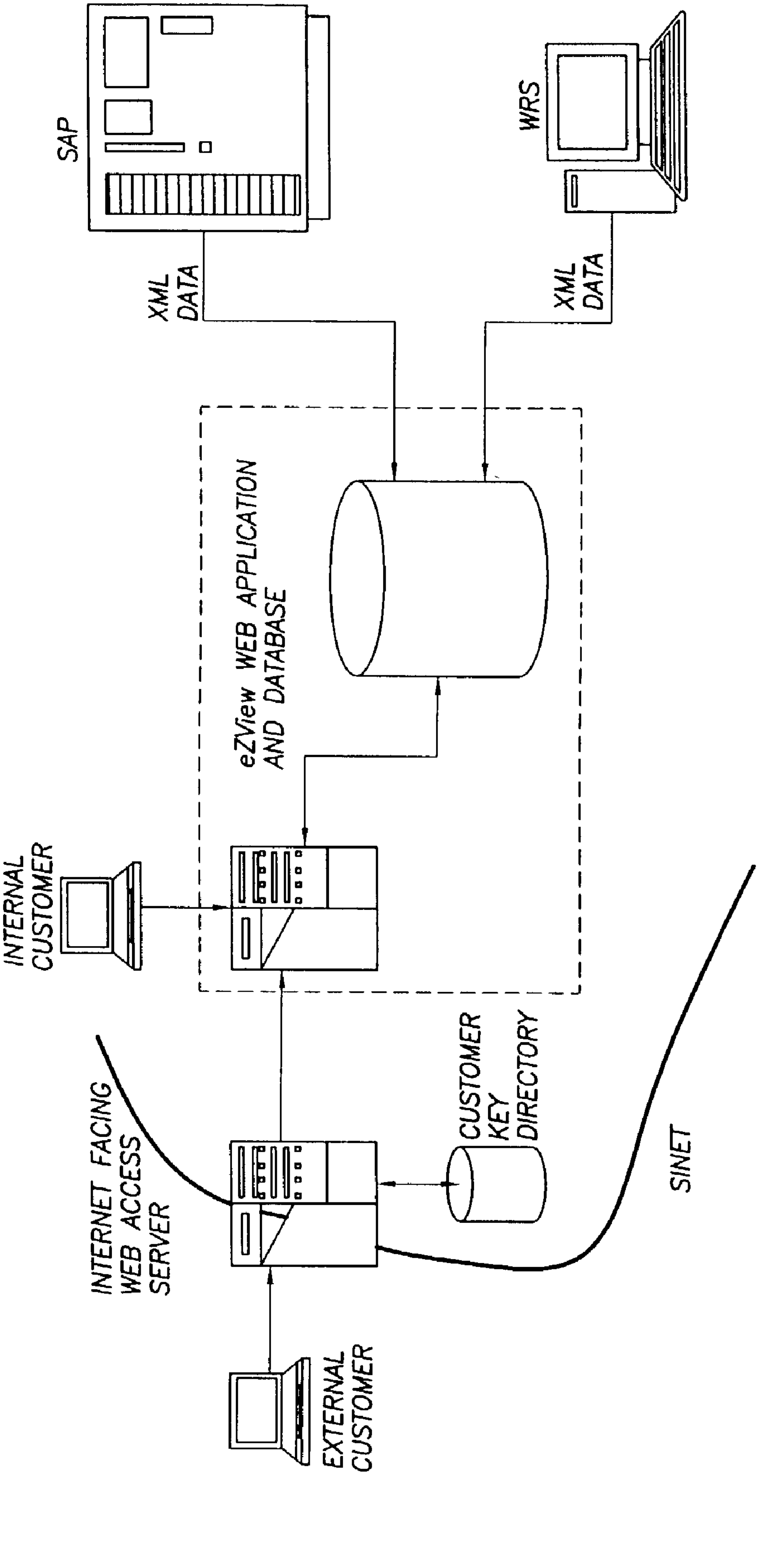

In FIG. 14, a schematic representation of the pilot project access and data flow to the web application and database is illustrated.

Application Development Specifications

Database Connection

The Application is connected to an Oracle Database containing the tables:

- The Table 'USER' contains all User Accounts having an access to the eZView. This table is maintained by the web application administrator.
- The Table COMPANY contains the entries that relate a global company code to individual sold_to or payer codes contained in the INVOICE_HEADER. Company is an entry in the user table. This table is maintained by the web application administrator.
- The Table FIELD_ORDER_HEADER contains all header data uploaded from the field order generation system For the pilot project, this will be the OFS WRS application.
- The Table FIELD_ORDER_LINE_ITEM contains all line item data uploaded from the field order generation system For the pilot project, this will be the OFS WRS application.
- The Table INVOICE_HEADER contains all header data (except trading partners) uploaded from the invoicing system. For the pilot project, this will be the NAM SAP system.
- The Table INVOICE_HEADER_TP contains the trading partner data. For the pilot project, the source will be the NAM SAP system.
- The Table INVOICE_LINE_ITEM contains all line item data uploaded from the invoicing system. For the pilot project, this will be the NAM SAP system.

Each INVOICE will be referenced to a FIELD_ORDER. This relationship will be indexed for faster search and retrieval.

Entries for the USER table and COMPANY table will be maintained via an administration view for the web application. Entries for the FIELD_ORDER and INVOICE tables will be loaded via interfaces to the WRS and SAP systems. The interfaced data will be received by the web application as XML documents.

Core Interface—Security

This includes the login page and the main menu from which the user can select the web application functions. This also includes the user management interfaces allowing the Web site administrator to add, remove and modify Users from the User Account Access table.

User Table:

| Field | Type/Size | Description |
|---|---|---|
| ID | Number(4,0) | Primary Key Autonumbered with a trigger and a sequence |
| UserIDInternal | Varchar2(50) | SLB Corporate Directory (LDAP) identifier of the user |
| UserIDExternal | Varchar2(60) | Trusted Web Server Directory identifier of the user |
| Name | Varchar2(100) | Full name (based on the “cn” attribute from SLB Corporate Directory or Trusted Web Server Directory) |
| Email | Varchar2(250) | Email Address (based on the “mail” attribute from SLB Corporate Directory or Trusted Web Server Directory) |
| UserLevel | Varchar2(50) | Access Level of the user within the site |
| Company | Varchar2(50) | Company data user is authorized to access—may be multiple entries |
| Seller | Number(10,0) | Seller data user is authorized to access—may be multiple entries |

COMPANY Table:

| Field | Type/Size | Description |
|---|---|---|
| ID_Company | Number(4,0) | Autonumbered with a trigger and a sequence |
| Company | Varchar2(50) | Key—Reference entered into user table |
| Company_code | Number(10,0) | Key—Invoicing system company code(s)—may be multiple entries |
| Company_text | Varchar2(50) | Descriptive text |

Internal users will validate via the standard HTK SLB Corporate Directory authentication tool. External users will be validated via PKI identification to the Trusted Web Server Directory.

Data Model

Table FIELD_ORDER_HEADER:

The FIELD_ORDER_TABLE will capture the header information from the field order upload, including the digital signature of the Customer wellsite representative.

| Field | Type/Size | Description |
|---|---|---|
| ID_FIELD_ORDER_HEADER | Number(10,0) | Autonumbered with a trigger and a sequence |
| <DocumentPurpose> | Varchar2(60) | Text field |
| <OriginalInvoiceNumber> | Number(10,0) | **will not be used in pilot, but fill be a future Key |
| <PurchaseOrderDate> | Date | Date of PO |
| <PurchaseOrderNumber> | Varchar2(50) | PO number |
| <ReleaseNumber> | Varchar2(50) | Reserve for future |
| <ChangeOrderSequenceNumber> | Varchar2(50) | Reserve for future |
| <FieldServiceOrderNumber> | Number(10,0) | Key—Reference number to FIELD_ORDER tables |
| <ContractNumber> | Varchar2(50) | **Will not be used in pilot, but will be future Key |
| <Currency> | Varchar2(10) | Currency of invoice amount |
| <AFENumber> | Varchar2(50) | AFE Number |
| <DeliveryTicketNumber> | Varchar2(50) | Reserve for future |
| <InternalCustomerNumber> | Number(10,0) | Reserve for future |

-continued

| Field | Type/Size | Description |
|---|---|---|
| <JobNumber> | Number(10,0) | **Will not be used in pilot, but will be future Alternate Key—Reference number to FIELD_ORDER tables |
| <WellNumber> | Varchar2(30) | Well Number |
| <WellName> | Varchar2(50) | Well Name |
| <WellLocation> | Varchar2(50) | Well Location |
| <LocationNumber> | Varchar2(10) | Well location number |
| <WellCountyParishBorough> | Varchar2(50) | Well location |
| <OffshoreZone> | Varchar2(50) | Well location |
| <FieldName> | Varchar2(50) | Well location |
| <ShipDate> | Date | Date |
| <ServiceStartDate> | Date | Date |
| <ServiceEndDate> | Date | Date |
| <Carrier> | Varchar2(60) | Reserve for future |
| <CustomerShipToNumber> | Number(10,0) | Customer ship to number |
| <CustomerShipToName> | Varchar2(50) | Customer Name |
| <CustomerShipToAddress1> | Varchar2(50) | Customer Address line |
| <CustomerShipToAddress2> | Varchar2(50) | Customer Address line |
| <CustomerShipToPOBox> | Varchar2(50) | Customer Address line |
| <CustomerShipToCity> | Varchar2(50) | Customer Address line |
| <CustomerShipToState-ProvinceCode> | Varchar2(50) | Customer Address line |
| <CustomerShipToPostalCode> | Varchar2(50) | Customer Address line |
| <CustomerShipToCountryCode> | Varchar2(50) | Reserve for future |
| <CustomerDUNSPlus4Number> | Number(15,0) | DUNS |
| <CustomerDUNSNumber> | Number(10,0) | DUNS |
| <SellerNumber> | Number(10,0) | **Will not be used in pilot, but will be future Key |
| <SellerName> | Varchar2(50) | Seller Name |
| <SellerAddress1> | Varchar2(50) | Seller Address line |
| <SellerAddress2> | Varchar2(50) | Seller Address line |
| <SellerPOBox> | Varchar2(50) | Seller Address line |
| <SellerCity> | Varchar2(50) | Seller Address line |
| <SellerState-ProvinceCode> | Varchar2(50) | Seller Address line |
| <SellerPostalCode> | Varchar2(50) | Seller Address line |
| <SellerCountryCode> | Varchar2(50) | Seller Address line |
| <CustomerJobRepName> | Varchar2(50) | Customer contact name |
| <CustomerJobRepTelephone> | Varchar2(50) | Customer contact telephone number |
| <CustomerJobRepFax> | Varchar2(50) | Customer contact fax number |
| <CustomerJobRepEmail> | Varchar2(250) | Customer contact email address |
| <OrderAmountBeforeTax> | Currency(10,2) | Amount |
| <DigitalSignatureCookie> | Binary(1024) | Field Order Digital Signature |

Table FIELD_ORDER_LINE_ITEM

This table will capture the line items uploaded for each field order.

| | | |
|---|---|---|
| ID_FIELD_ORDER_LINE_ITEM | Number(10,0) | Autonumbered with a trigger and a sequence |

-continued

| | | |
|---|---|---|
| <FieldServiceOrderNumber> | Number(10,0) | Key—Reference number to FIELD_ORDER tables |
| <JobNumber> | Number(10,0) | **Will not be used in pilot, but will be future Alternate Key—Reference number to FIELD_ORDER tables |
| <LineItemLineNumber> | Number(10,0) | Line Item Number |
| <LineItemHighLevelReference> | Varchar2(50) | Line item reference code |
| <LineItemCustomerItemNumber> | Varchar2(50) | Line item reference code |
| <LineItemCustomerItemDescription> | Varchar2(50) | Text |
| <LineItemSellerItemNumber> | Varchar2(50) | Line item reference code |
| <LineItemSellerItemDescription> | Varchar2(50) | Line item reference code |
| <LineItemQuantity> | Number(10,0) | Line item quantity |
| <LineItemUOM> | Varchar2(50) | Unit of measure |
| <LineItemUnitPrice> | Currency(10,2) | Amount |
| <LineItemGrossValue> | Percent(4,2) | Amount |
| <LineItemDiscountAmount> | Currency(10,2) | Amount |
| <LineItemDiscountPercent> | Percent(4,2) | Percent |
| <LineItemSurchargeAmount> | Currency(10,2) | Amount |
| <LineItemSurchargePercent> | Percent(4,2) | Percent |
| <LineItemNetValue> | Currency(10,2) | Amount |
| <Comment> | Varchar2(100) | Comment Text |

Table INVOICE_HEADER:

The INVOICE_HEADER table will capture the header information from the invoice upload.

| Field | Type/Size | Description |
|---|---|---|
| ID_INVOICE_HEADER | Number(10,0) | Autonumbered with a trigger and a sequence |
| InvoiceDate | Date | Invoice Date |
| DocCreatedDate | Date | Date Idoc was created |
| InvoiceNumber | Number(10,0) | Primary Key-Invoice Number |
| DocumentPurpose | Varchar2(5) | Text field |
| OriginalInvoiceNumber | Number(10,0) | **will not be used in pilot, but fill be a future Key |
| PurchaseOrderDate | Date | Date of PO |
| PurchaseOrderNumber | Varchar2(25) | PO number |
| ReleaseNumber | Varchar2(25) | Reserve for future |
| ChangeOrderSequenceNumber | Varchar2(25) | Reserve for future |
| SLBOrderNumber | Number(10,0) | Schlumberger Order Number |
| FieldServiceOrderNumber | Number(10,0) | Foreign Key-Reference number to FIELD_ORDER tables |
| ContractNumber | Varchar2(50) | **Will not be used in pilot, but will be future Key |
| Currency | Varchar2(5) | Currency of invoice amount |
| AFE | Varchar2(50) | AFE Number |
| DeliveryTicketNumber | Varchar2(50) | Reserve for future |
| InternalCustomerNumber | Number(10,0) | Reserve for future |

-continued

| Field | Type/Size | Description |
|---|---|---|
| JobNumber | Number(10,0) | **Will not be used in pilot, but will be future Alternate Key-Reference number to FIELD_ORDER tables |
| WellNumber | Varchar2(25) | Well Number |
| WellName | Varchar2(50) | Well Name |
| WellLocation | Varchar2(50) | Well Location |
| LocationNumber | Varchar2(25) | Well location number |
| WellCountyParishBorough | Varchar2(50) | Well location |
| OffshoreZone | Varchar2(50) | Well location |
| FieldName | Varchar2(50) | Well location |
| ShipDate | Date | Date |
| ServiceStartDate | Date | Date |
| ServiceEndDate | Date | Date |
| Carrier | Varchar2(50) | Reserve for future |
| Data1 | Varchar2(50) | Required trading partner information. Varies depending on TP |
| Data2 | Varchar2(50) | Required trading partner information Varies depending on TP |
| Data3 | Varchar2(50) | Required trading partner information Varies depending on TP |
| Data4 | Varchar2(50) | Required trading partner information Varies depending on TP |
| Data5 | Varchar2(50) | Required trading partner information Varies depending on TP |
| Data6 | Varchar2(50) | Required trading partner information. Varies depending on TP |
| Data7 | Varchar2(50) | Required trading partner information Varies depending on TP |
| Data8 | Varchar2(50) | Required trading partner information Varies depending on TP |
| TermsDiscountDueDate | Date | Date |
| TermsDiscountDaysDue | Number(10,0) | Days due |
| TermsNetDueDate | Date | Date |
| TermsNetDays | Number(10,0) | Net days |
| TermsDescription | Varchar2(50) | Text |
| TermsDiscountAmount | Number(10,2) | Amount |
| TotalGrossInvoiceAmount | Number(10,2) | Amount |
| TotalDiscountAmount | Number(10,2) | Amount |
| InvoiceAmountBeforeTax | Number(10,2) | Amount |
| GrossReceiptsTaxBasis | Number(10,2) | Amount |
| GrossReceiptsTaxPercent | Number(4,3) | Tax percentage |
| GrossReceiptsTaxAmount | Number(10,2) | Tax amount |
| CountyParishBoroughTaxBasis | Number(10,2) | Amount |
| CountyParishBoroughTaxPercent | Number(4,3) | Tax percentage |
| CountyParishBoroughTaxAmount | Number(10,2) | Tax amount |
| MetropolitanTaxBasis | Number(10,2) | Amount |
| MetropolitanTaxPercent | Number(4,3) | Tax percentage |
| MetropolitanTaxAmount | Number(10,2) | Tax amount |
| Local1TaxBasis | Number(10,2) | Amount |
| Local1TaxPercent | Number(4,3) | Tax percentage |
| Local1TaxAmount | Number(10,2) | Tax amount |
| Local2TaxBasis | Number(10,2) | Amount |
| Local2TaxPercent | Number(4,3) | Tax percentage |
| Local2TaxAmount | Number(10,2) | Tax amount |
| Local3TaxBasis | Number(10,2) | Amount |
| Local3TaxPercent | Number(4,3) | Tax percentage |
| Local3TaxAmount | Number(10,2) | Tax amount |

-continued

| Field | Type/Size | Description |
|---|---|---|
| StateTaxBasis | Number(10,2) | Amount |
| StateTaxPereent | Number(4,3) | Tax percentage |
| StateTaxAmount | Number(10,2) | Tax amount |
| WellServiceTaxBasis | Number(10,2) | Amount |
| WellServiceTaxPercent | Number(4,3) | Tax percentage |
| WellServiceTaxAmount | Number(10,2) | Tax amount |

Table INVOICE_HEADER_TP

| Field | Type/Size | Description |
|---|---|---|
| ID_INVOICE_HEADER_TP | Number(10,0) | Autonumbered with a trigger and a sequence |
| InvoiceNumber | Number(10) | Foreign Key, referencing the Primary Key INV_NO in INVOICE_HEADER table |
| Type | Varchar2(20) | Trading Partner Type, ie Bill-To, Ship-To, etc |
| Number | Number(20) | Number assigned to this trading partner |
| NumAtCost | Number(20) | SLB number at the trading partner's location Not always meaningful |
| Name1 | Varchar2(50) | 1st name assigned to trading partner |
| Name2 | Varchar2(50) | 2nd name assigned to trading partner |
| Name3 | Varchar2(50) | 3rd name assigned to trading partner |
| Name4 | Varchar2(50) | 4th name assigned to trading partner |
| Address1 | Varchar2(50) | 1st address of trading partner |
| Address2 | Varchar2(50) | 2nd address of trading partner |
| POBox | Varchar2(20) | PO Box number of trading partner |
| City | Varchar2(50) | City of trading partner |
| CountyParishBorough | Varchar2(50) | County of trading partner |
| District | Varchar2(50) | Trading partner's district |
| StateProvince | Varchar2(5) | State or province of trading partner |
| PostalCodeStreet | Varchar2(15) | Street address zip code |
| PostalCodePOB | Varchar2(15) | PO box zip code |
| Country | Varchar2(5) | Trading partner's country |
| Telephone | Varchar2(15) | Trading partner's telephone number |
| Fax | Varchar2(15) | Trading partner's fax number |
| YourRef | Varchar2(50) | Data required by trading partner |
| Language | Varchar2(1) | Language code |
| DataEntryAlias | Varchar2(30) | Data entry personnel's alias |
| Organization | Varchar2(50) | Schlumberger division corresponding to product line codes, ie STCW, STCD, etc |

Table INVOICE_LINE_ITEM

The INVOICE_LINE_ITEM table will capture the line item information from the invoice upload. It will also have an additional entry to mark each line item with a binary digital signature token.

| Field | Type/Size | Description |
|---|---|---|
| ID_INVOICE_LINE_ITEM | Number(10,0) | Autonumbered with a trigger and a sequence |
| <InvoiceNumber> | Number(10,0) | Key—Invoice Number |
| <DigitalSignatureCookie> | Binary(1024) | Invoice item Digital Signature |
| <LineItemLineNumber> | Number(10,0) | Line Item Number |
| <LineItemHighLevelReference> | Varchar2(50) | Line item reference code |
| <LineItemCustomerItemNumber> | Varchar2(50) | Line item reference code |
| <LineItemCustomerItemDescription> | Varchar2(50) | Text |
| <LineItemSellerItemNumber> | Varchar2(50) | Line item reference code |
| <LineItemSellerItemDescription> | Varchar2(50) | Line item reference code |
| <LineItemQuantity> | Number(10,0) | Line item quantity |
| <LineItemUOM> | Varchar2(50) | Unit of measure |
| <LineItemUnitPrice> | Currency(10,2) | Amount |
| <LineItemGrossValue> | Percent(4,2) | Amount |
| <LineItemDiscountAmount> | Currency(10,2) | Amount |
| <LineItemDiscountPercent> | Percent(4,2) | Percent |
| <LineItemSurchargeAmount | Currency(10,2) | Amount |
| <LineItemSurchargePercent> | Percent(4,2) | Percent |
| <LineItemNetValue> | Currency(10,2) | Amount |
| <LineItemGrossReceiptsTaxBasis> | Varchar2(50) | Tax Basis |
| <LineItemGrossReceiptsTaxPercent> | Percent(4,2) | Tax percentage |
| <LineItemGrossReceiptsTaxAmount> | Currency(10,2) | Tax amount |
| <LineItemCountryParishBoroughTaxBasis> | Varchar2(50) | Tax Basis |
| <LineItemCountryParishBoroughTaxPercent> | Percent(4,2) | Tax percentage |
| <LineItemCountryParishBoroughTaxAmount> | Currency(10,2) | Tax amount |
| <LineItemMetropolitanTaxBasis> | Varchar2(50) | Tax Basis |
| <LineItemMetropolitanTaxPercent> | Percent(4,2) | Tax percentage |
| <LineItemMetropolitanTaxAmount> | Currency(10,2) | Tax amount |
| <LineItemLocal1TaxBasis> | Varchar2(50) | Tax Basis |
| <LineItemLocal1TaxPercent> | Percent(4,2) | Tax percentage |
| <LineItemLocal1TaxAmount> | Currency(10,2) | Tax amount |
| <LineItemLocal2TaxBasis> | Varchar2(50) | Tax Basis |
| <LineItemLocal2TaxPercent> | Percent(4,2) | Tax percentage |
| <LineItemLocal2TaxAmount> | Currency(10,2) | Tax amount |
| <LineItemLocal3TaxBasis> | Varchar2(50) | Tax Basis |
| <LineItemLocal3TaxPercent> | Percent(4,2) | Tax percentage |
| <LineItemLocal3TaxAmount> | Currency(10,2) | Tax amount |
| <LineItemStateTaxBasis> | Varchar2(50) | Tax Basis |
| <LineItemStateTaxPercent> | Percent(4,2) | Tax percentage |
| <LineItemStateTaxAmount> | Currency(10,2) | Tax amount |
| <LineItemWellServiceTaxBasis> | Varchar2(50) | Tax Basis |
| <LineItemWellServiceTaxPercent> | Percent(4,2) | Tax percentage |
| <LineItemWellServiceTaxAmount> | Currency(10,2) | Tax amount |
| <Comment> | Varchar2(100) | Comment Text |

Key Functions

The eZView web application is where the field service report and invoice are compared. This application will allow selection of a requested invoice, comparison of items and quantity between field service report and invoice, plus capture of digital signature of customer approving any displayed differences by line item. This application will also secure access to the invoices between different customers.

The underlying application database will capture field orders, invoices and digital signatures.

Navigation in the Application

Access

External users will access the application via an extranet facing web server and have their PKI key validated by a Customer Directory.

Internal users will access the application directly via the intranet, and will validate themselves via standard HTK objects to the SLB Corporate Directory (LDAP).

Once both External and Internal users have passed initial checks to access the eZView application, they will need to be validated against the User table before gaining access to Invoice records. Users will be assigned one of three levels of access:

a) Administrator—Full rights to create users and maintain the application.

b) Customer—View Field orders and Invoices in approved customer companies, add comments to Invoice line items, and digitally sign Invoice line items not matched against the Field order.

c) Seller—View Field orders and Invoices in approved Customer Companies and add comments to Field Order Line Items.

d) View—View Field orders and Invoices in approved customer companies.

The initial application screen will offer all users the choices to:

a) Search by Invoice Number b) Search by Field Order Number c) Log out and exit

In addition, users assigned administrator access will have an additional selection to:

d) Access User Administration to create or change user access.

Select Invoice and Order to Match

The user will enter either the Invoice number or Field order number to initiate the search. The indexed INVOICE_HEADER or FIELD_ORDER_HEADER tables will be searched for a matching entry.

If an Invoice number is used for the search and a match is found in <InvoiceNumber> of the INVOICE_HEADER table, the <FieldServiceOrderNumber> from the matched INVOICE_HEADER entry will be used as the source of a search in <FieldServiceOrderNumber> of the FIELD_ORDER_HEADER table.

If a Field Order Number is entered for a search, the <FieldServiceOrderNumber> of both INVOICE_HEADER and FIELD_ORDER_HEADER will be searched for a match. If a record in the INVOICE_HEADER selected is matched by either search method, users assigned Customer access rights will have the <CustomerBillToNumber> and <CustomerShipToNumber> in the INVOICE_HEADER table compared to the Company_code in the Company table referenced by the users Company entry in the User table. If either the <CustomerBillToNumber> or <CustomerShipToNumber> match a Company_code assigned to user, the use will be authorized to access the Invoice data. If no Company_code match is found, the user will be returned to the selection screen with a message indicating they do not have access to the referenced Company_code.

If no <InvoiceNumber> match is found for an Invoice number search, the user will be returned to the selection screen with a message that no match was found.

If no <FieldServiceOrderNumber> match is found for a Field Order Number search in the INVOICE_HEADER table, a user with Customer access rights will be returned to the selection screen with a message that no match was found. If the user has Seller access rights and there is a <FieldServiceOrderNumber> match in the FIELD_ORDER_HEADER table, they will be forwarded to the comparison screen. A browser 'Back' button should also log the user out.

Figure 15:
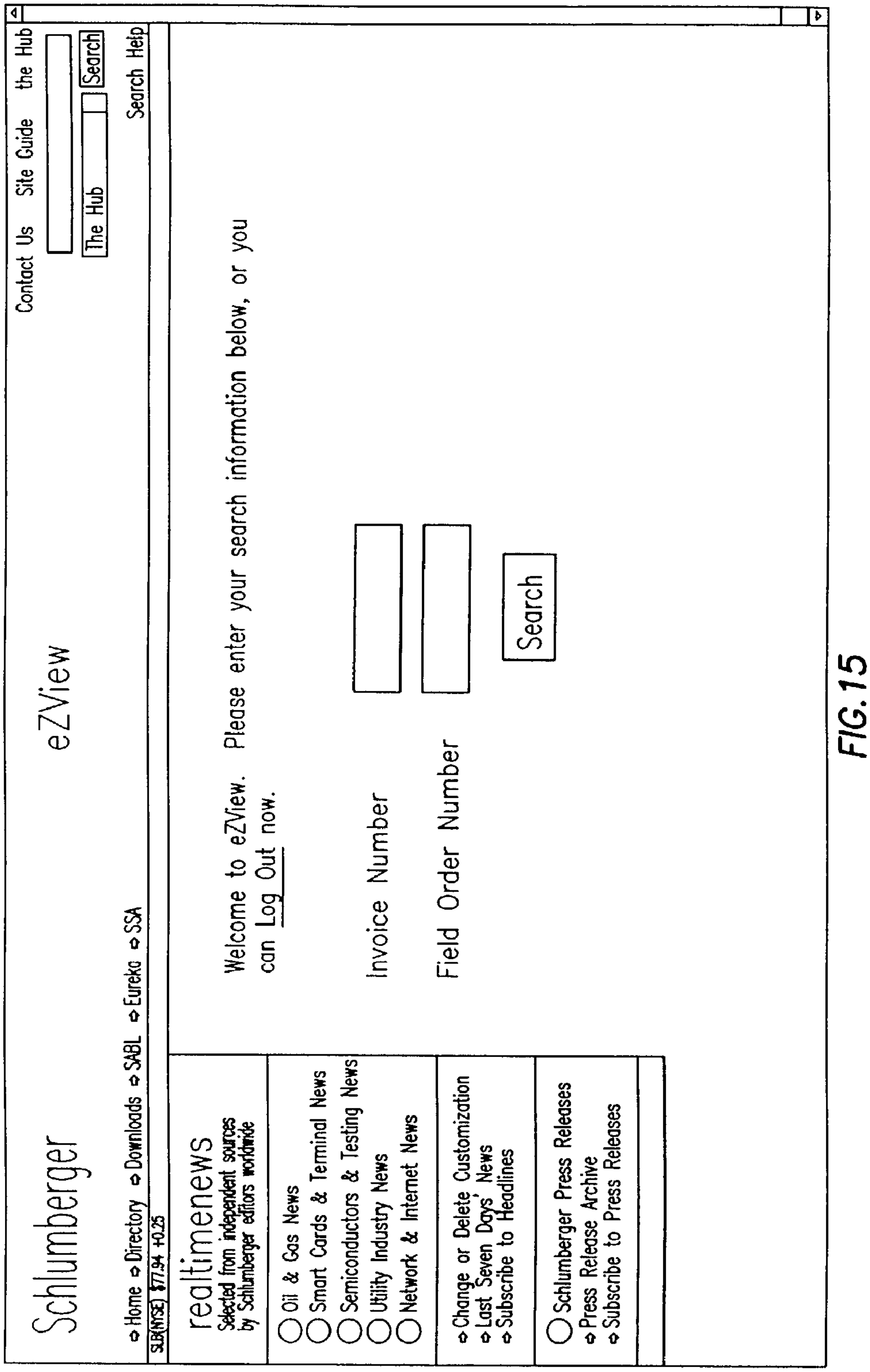

Refer to FIG. 15.

Display and Comparison of Field Order and Invoice—This screen has seven different Areas populated from the INVOICE_HEADER, INVOICE_HEADER_TP, INVOICE_LINE_ITEM and FIELD_ORDER_LINE_ITEM tables. (In the event a user has Seller access rights and no INVOICE_HEADER match was found, the FIELD_ORDER_HEADER table will be used in place of the INVOICE_HEADER table)

Figure 16:
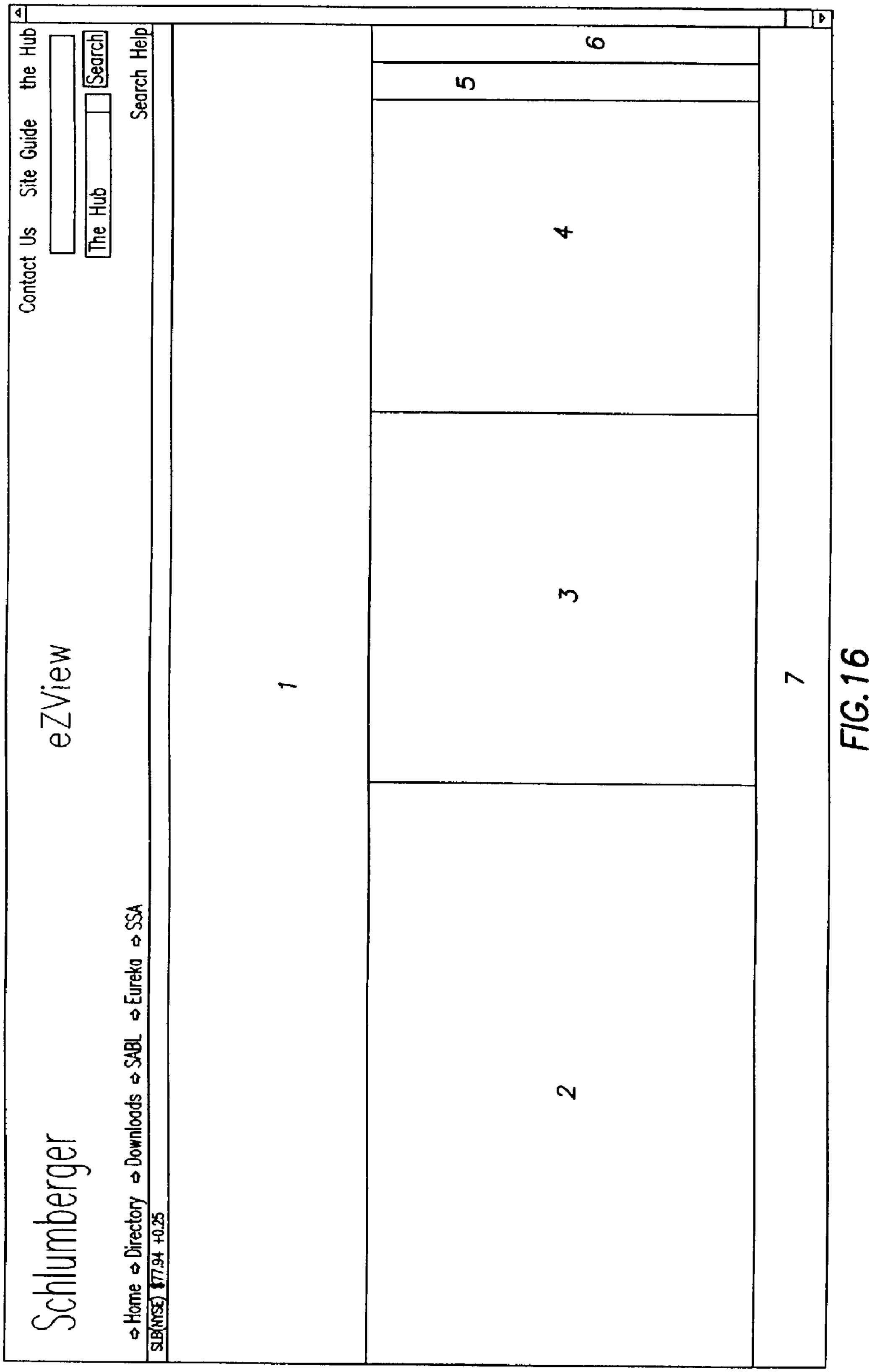

In FIG. 16, the screen layout is illustrated in FIG. 16.

Area 1—This area contains the Well Header information. It is populated from the INVOICE_HEADER and INVOICE_HEADER_TP tables (unless no Invoice yet exists..see above). It is formatted to appear as a standard Schlumberger OFS Invoice header (see appendix 1).

Area 2—This area contains Line Item line number, material and description. It is populated from the INVOICE_LINE_ITEM table as primary, or FIELD_ORDER_LINE ITEM table if no match exists in the INVOICE_LINE_ITEM table. All line items that reference the <InvoiceNumber> in the selected INVOICE_HEADER table record will be checked for match. This area must lock with Areas 3, 4, 5 and, when the entries that populate area 3 match the entries in area 4, the default text font color will be used. When there is no match., a high lighting color will be used for the line item font (red as an example).

The INVOICE_LINE_ITEMs and FIELD_ORDER_LINE_ITEMs will be checked, then grouped by <LineItemHighLevelReference>. Within each group the low level materials description <LineItemSellerItemDescription> will be displayed by <LineItemSellerItemNumber> in the order 6VDESURCH, 6XDEPCHG, 6XOPECHG, 6XFLATCH, 6XGRDEPH-1, 6XGROPE-1 if present.

Area 3—This area contains the Field Order quantity <LineItemQuantity>, Unit Price <LineItemUnitPrice>, % discount <LineItemDiscountPercent> and Net amount <LineItemNetValue>. It is populated from the FIELD_ORDER_LINE_ITEM table. All line items that reference the <FieldServiceOrderNumber> in the selected INVOICE_HEADER table record will be displayed. Each line item will be aligned with the corresponding High <LineItemHighLevelReference> and Low <LineItemSellerItemNumber> level material sorted in Area 2. When the Field Order quantity <LineItemQuantity> and Net amount <LineItemNetValue> in area 3 matches a line item in area 4, the default text font color will be used. When there is no match., a high lighting color will be used for the line item font (red as an example).

Area 4—This area contains the Invoice <LineItemQuantity>, Unit Price <LineItemUnitPrice>, % discount <LineItemDiscountPercent> and Net amount <LineItemNetValue>. It is populated from the INVOICE_LINE_ITEM table. All line items that reference the <InvoiceNumber> in the selected INVOICE_HEADER table record will be displayed. Each line item will be aligned with the corresponding High <LineItemHighLevelReference> and Low <LineItemSellerItemNumber> level material sorted in Area 2. When the Invoice quantity <LineItemQuantity> and Net amount <LineItemNetValue> in area 4 matches a line item in area 3, the default text font color will be used. When there is no match., a high lighting color will be used for the line item font (red as an example).

Area 2, 3, & 4—If any line item contains a non-null value in <Comment>, the text in <Comment> should appear in a text box when the cursor passes over the appropriate line item.

Area 5—This area will contain a check symbol ☑ if the line item quantity <LineItemQuantity> and Net amount <LineItemNetValue> in areas 3 and 4 match on the same line.

Area 6—This area will contain a star symbol □ if the line items in areas 3 and 4 match and the referenced FIELD_ORDER_HEADER table <DigitalSignatureCookie> contains a digital signature cookie. If the line item in Area 3 does not match the corresponding line item in Area 4, the Area will contain a star symbol □ if the INVOICE_LINE_ITEM table <DigitalSignatureCookie> contains a digital signature cookie. Otherwise, the line will contain an empty box □.

Area 7—This area will contain summary information, navigation and digital signature action buttons. The summary information to be displayed:

1. Field Order has been digitally signed (<DigitalSignatureCookie> from FIELD_ORDER_HEADER).
2. Number of non-tax lines that match between Field order and Invoice.
3. Number of non-tax lines that do not match between Field order and invoice that have been digitally signed on the invoice (<DigitalSignatureCookie> from INVOICE_LINE_ITEM).
4. Indicator that all line items resulting in Invoice pre-tax total have been digitally signed.
5. Percentage difference between Field order and pre-tax Invoice totals.

Action buttons that will be available:

1. Digitally sign a selected unmatched Invoice line item.
2. Digitally sign ALL remaining unmatched line items.
3. Return to selection screen.
4. Log off and exit application.

Figure 17:
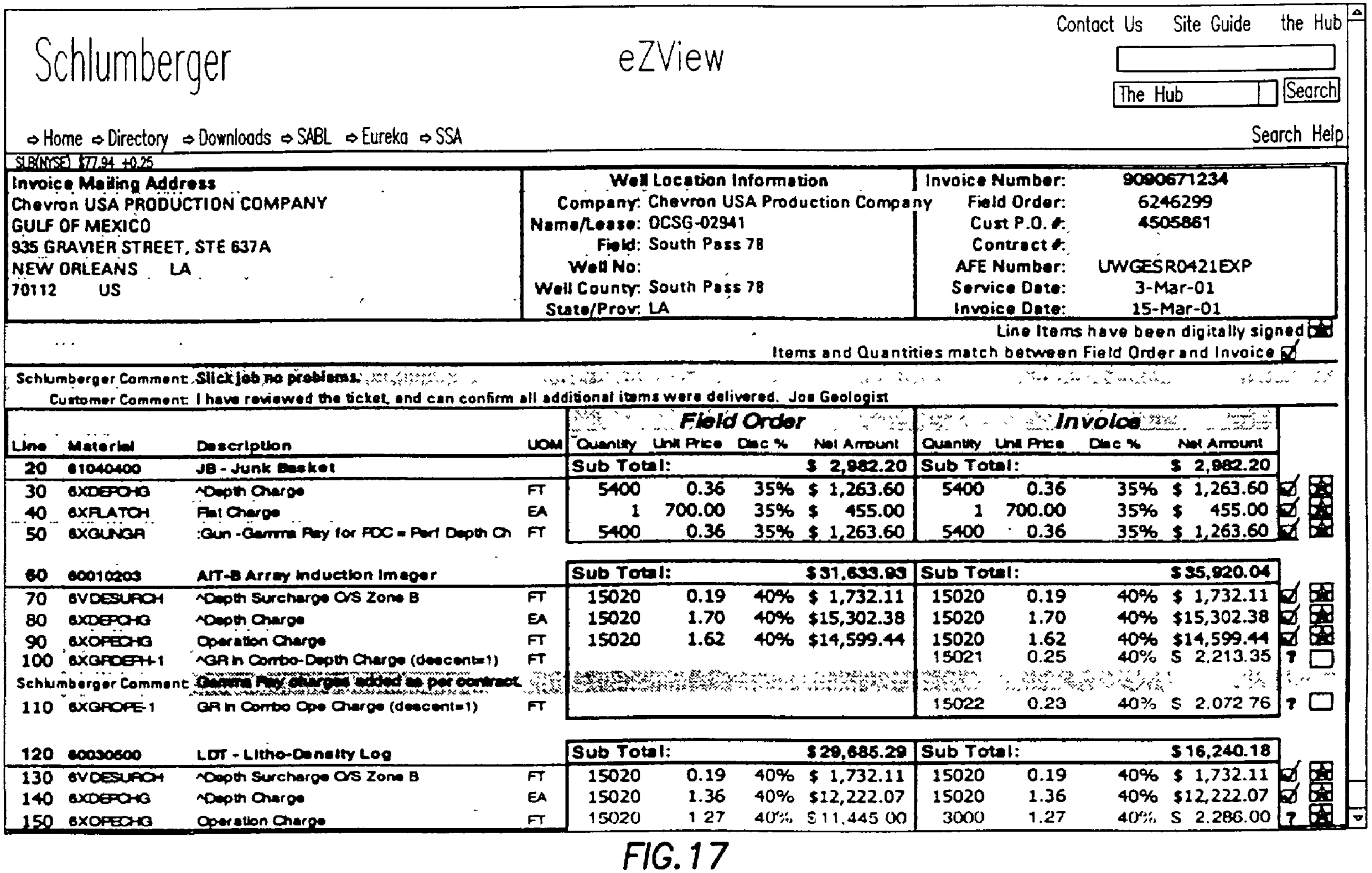

Refer to FIG. 17.

Generic Manipulation of #Objectname1# (Attached to Tablename1)

Search

#Fieldname# Selection type

<InvoiceNumber> INVOICE_HEADER Match from screen input

<FieldServiceOrderNumber> FIELD_ORDER_HEADER Match from screen input

Display

When the criteria has been defined and accepted on the 1$^{st}$ screen the 2$^{nd}$ screen is displaying the result into the previously described format showing the following information in several columns:

| Field | Area 2 Source | Area 3 Source |
|---|---|---|
| 1. <LineItemHighLevelReference> | FIELD_ORDER_LINE_ITEM | INVOICE_LINE_ITEM |
| 2. <LineItemSellerItemNumber> | FIELD_ORDER_LINE_ITEM | INVOICE_LINE_ITEM |
| 3. <LineItemSellerItemDescription> | FIELD_ORDER_LINE_ITEM | INVOICE_LINE_ITEM |
| 4. <LineItemQuantity> | FIELD_ORDER_LINE_ITEM | INVOICE_LINE_ITEM |
| 5. <LineItemUnitPrice> | FIELD_ORDER_LINE_ITEM | INVOICE_LINE_ITEM |
| 6. <LineItemGrossValue> | FIELD_ORDER_LINE_ITEM | INVOICE_LINE_ITEM |
| 7. <LineItemDiscountAmount> | FIELD_ORDER_LINE_ITEM | INVOICE_LINE_ITEM |
| 8. <LineItemNetValue> | FIELD_ORDER_LINE_ITEM | INVOICE_LINE_ITEM |

Add

See sections 4.2.1 and 4.2.2 for fields and tables to be added for new user accounts. INVOICE and FIELD_ORDER HEADER and LINE_ITEM data will be delivered from external applications in XML format. The application should read from a FIELD_ORDER directory for Field orders, and an INVOICE directory for Invoices. The XML tag definitions should be referenced by the application from external files XML_TAG_FIELD_ORDER and XML_TAG_INVOICE to provide maintenance capability for the XML tags.

The naming convention to be used for the Field Order files in FO(field order #).xml The naming convention to be used for Invoice files are INVOICE(invoice #).xml Update See sections 4.2.1 and 4.2.2 for fields and tables to be updated for user accounts. The <DigitalSignatureCookie> field of the INVOICE_LINE_ITEM can be updated with the digital signature of the Customer logged in.

Refer to FIG. 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A program storage device readable by a machine and tangibly embodying a program of instructions executable by the machine to perform method steps for generating and displaying a special report on a display screen of said machine, accessible to a customer, said method steps comprising:

receiving a plurality of input data comprised of a plurality of field orders and a plurality of invoices, each of said plurality of field orders comprising a digital signature obtained at a point of delivery for indicating actual receipt of goods or services by the customer;

receiving supplier comments and documentation from a supplier of at least one of said goods or services, said supplier comments and documentation being used to generate a first invoice from one of said plurality of invoices that is approved by said supplier; automatching a field order number of a first field order of said plurality of field orders to said first invoice, said first field order comprising a first quantity and a first unit price specified by said customer, indicating actual receipt of said at least one of said goods or services;

identifying a discrepancy between said first quantity and said first unit price of said goods and services actually received and a second quantity and a second unit price in said first invoice, said second quantity and said second unit price specified by the supplier; and generating and displaying said special report on said display screen of said machine in response to said plurality of input data, said special report being displayed on said display screen including a first portion of information comprised of said plurality of field orders, a second portion of information comprised of said plurality of invoices corresponding, respectively, to said one or more field orders, and a third portion of information comprised of said discrepancy.

2. The program storage device of claim 1, wherein said first field order illustrates items ordered and received by the customer, and wherein said first particular invoice illustrates amounts billed to said customer for said items ordered by said customer.

3. The program storage device of claim 1, wherein said first field order is displayed adjacent to and on a same line as said first invoice on said display screen of said machine.

4. The program storage device of claim 1, wherein said special report being displayed on said display screen of said machine further includes a fourth portion of information comprised of a plurality of descriptions of said goods or services corresponding, respectively, to said plurality of field orders and to said plurality of invoices.

5. The program storage device of claim 4, wherein said plurality of descriptions of said goods or services being displayed on said display screen includes a first description of said goods or services, said first description of said goods or services being displayed adjacent to and on a same line as said first field order on said display screen, said first field order being displayed adjacent to and on said same line as said first invoice on said display screen, said first field order illustrating items ordered and received by the customer, said first description of said goods or services illustrating a description of said items ordered by said customer, said first invoice illustrating amounts billed to said customer for said items ordered by said customer.

6. The program storage device of claim 1, wherein the special report is adapted to be viewable by the customer over the internet, after the customer inputs information satisfying security constraints.

7. A method of generating and displaying a report on a display screen for a buyer of goods or services including a first portion of data comprised of a plurality of field orders and a second portion of data comprised of a plurality of invoices corresponding, respectively, to said plurality of field orders, comprising the steps of:

- collecting a first plurality of data including a first dataset comprised of a plurality of field orders digitally signed at a point of delivery by the buyer for indicating actual receipt of said goods or services by the buyer, and a second dataset comprised of a plurality of invoices, and providing said first plurality of data representing input data to a server;
- receiving supplier comments and documentation from a supplier of at least one of said goods or services, said supplier comments and documentation being used to generate a first invoice from one of said plurality of invoices that is approved by said supplier;
  - accessing said server when said first plurality of data is provided to said server;
  - during the accessing of said server, introducing at least one data value to said server;
  - in response to said at least one data value, automatching a field order number of a first field order of said plurality of field orders to said first invoice, said first field order comprising a first quantity and a first unit price specified by said buyer, indicating actual receipt of said at least one of said goods or services;
  - identifying a discrepancy between said first quantity and said first unit price of said goods and services actually received and a second quantity and a second unit price in said first invoice, said second quantity and said second unit price specified by said supplier; and
  - generating and displaying said report on said display screen, said report adapted to be viewable by the buyer and including at least said first portion of data, said second portion of data, and said discrepancy, said first portion of data including said plurality of field orders, said second portion of data including said plurality of invoices corresponding, respectively, to said plurality of field orders, said report adapted to be viewable by the buyer.

8. The method of claim 7, wherein said first field order in said report is located adjacent to said first invoice in said report when said report is displayed on said display screen.

9. The method of claim 7, wherein said first field order in said report is located adjacent to and on a same line as said first invoice in said report when said report is displayed on said display screen.

10. The method of claim 7, wherein said report includes at least said first portion of data and said second portion of data and a third portion of data, said first portion of data including said plurality of field orders, said second portion of data including said plurality of invoices corresponding, respectively, to said plurality of field orders, said third portion of data including a plurality of descriptions of said goods or services corresponding, respectively, to said plurality of field orders and said plurality of invoices.

11. The method of claim 10, wherein said plurality of descriptions of said goods or services in said third portion of data includes a first description, said first description being located adjacent to and on a same line as said first field order and said first field order being located adjacent to and on said same line as said first invoice when said report is displayed on said display screen.

12. The method of claim 7, wherein collecting said first plurality of data including said first dataset comprised of said plurality of field orders and said second dataset comprised of said plurality of invoices and providing said first plurality of data representing input data to said server, comprises the steps of: obtaining a buyer's digital signature on said first field order and transmitting the buyer's digitally signed field order to said server; obtaining a signed and edited field order from said supplier and transmitting the supplier's signed and edited field order to a mainframe computer; and creating said first invoice and a traditional invoice in said mainframe computer in response to said supplier's signed and edited field order, transmitting said first invoice from said mainframe computer to said server, and transmitting said traditional invoice to said buyer.

13. The method of claim 12, wherein said first field order in said report is located adjacent to and on a same line said first invoice in said report when said report is displayed on said display screen.

14. The method of claim 12, wherein said report includes at least said first portion of data and said second portion of data and a third portion of data, said first portion of data including said plurality of field orders, said second portion of data including said plurality of invoices corresponding, respectively, to said plurality of field orders, said third portion of data including a plurality of descriptions of said goods or services corresponding, respectively, to said plurality of field orders and said plurality of invoices.

15. The method of claim 14, wherein said plurality of descriptions of said goods or services in said third portion of data includes a first description, said first description being located adjacent to and on a same line as said first field order and said first field order being located adjacent to and on said same line as said first invoice when said report is displayed on said display screen.

16. A server adapted for receiving a plurality of field orders digitally signed by a plurality of buyers, said plurality of field orders indicating actual receipt of goods or services by the plurality of buyers who, respectively, digitally signed said plurality of field orders, and a plurality of corresponding invoices, comprising:

a processor adapted to:

receive said plurality of field orders digitally signed at a point of delivery by said plurality of buyers and said plurality of corresponding invoices;

receiving supplier comments and documentation from a supplier of at least one of said goods or services, said supplier comments and documentation being used to generate a first invoice of one of said plurality of corresponding invoices that is approved by said supplier;

automatch a field order number of a first field order of said plurality of field orders to said first invoice, said first field order comprising a first quantity and a first unit price specified by a buyer of the plurality of buyers, indicating actual receipt of at least one of said goods or services; and identify a discrepancy between said first quantity and said first unit price of said goods and services actually received and a second quantity and a second unit price in said first invoice, said second quantity and said second unit price specified by said supplier;

a display screen; and a memory storing a report generation software, said report generation software stored in said memory having a particular characteristic, said particular characteristic of said report generation software stored in said memory of said server being selected such that, when said report generation software stored in said memory is executed by said processor in conjunction with said plurality of field orders digitally signed by said plurality of buyers and said plurality of corresponding invoices, a special report is displayed on said display screen of said server, said special report including a first portion of data comprised of said plurality of field orders, a second portion of data comprised of said plurality of invoices, and a third portion of data comprised of said discrepancy, said first field order being displayed adjacent to said first invoice in said special report being displayed on said display screen of said server.

17. The server of claim 16, wherein said special report further comprises a fourth portion of data consisting of a plurality of descriptions of said goods or services, a first description of said plurality of descriptions of said goods or services in said fourth portion of data being displayed adjacent to said first field order in said first portion of data, said first field order in said first portion of data being displayed adjacent to said first invoice in said second portion of data.

18. The server of claim 16, wherein the special report is adapted to be viewable to by the buyer over the internet, after the buyer inputs information satisfying security constraints.

19. An apparatus adapted for generating a report for a buyer of goods or services, said report including a first portion of data comprised of a plurality of field orders, said field orders indicating actual receipt of said goods or services by the buyer, and a second portion of data comprised of a plurality of invoices corresponding, respectively, to said plurality of field orders, comprising:

computer server apparatus responsive to a plurality of field orders digitally signed at a point of delivery by the buyer and to a plurality of invoices adapted for:

receive supplier comments and documentation from a supplier of at least one of said goods or services, said supplier comments and documentation being used to generate a first invoice from one of said plurality of invoices that is approved by said supplier;

automatching a field order number of a first field order of said plurality of field orders to said first invoice, said first field order comprising a first quantity and a first unit price specified by said buyer, indicating actual receipt of at least one of said goods or services;

identifying a discrepancy between said first quantity and said first unit price of said goods and services actually received and a second quantity and a second unit price in said first invoice, said second quantity and said second unit price specified by said supplier; and generating a report for said buyer of said goods or services, said report adapted to be viewable by the buyer, said report including said first portion of data comprised of a plurality of field orders and said second portion of data comprised of a plurality of invoices corresponding, respectively, to said plurality of field orders.

* * * * *